United States Patent [19]
Aoki

[11] Patent Number: 5,309,151
[45] Date of Patent: May 3, 1994

[54] CURRENT-SUPPLYING INTEGRATED CIRCUIT

[75] Inventor: Kanji Aoki, Suwa, Japan

[73] Assignee: Seiko Epson Corporation, Tokyo, Japan

[21] Appl. No.: 839,058

[22] Filed: Feb. 18, 1992

Related U.S. Application Data

[63] Continuation of Ser. No. 430,174, Nov. 1, 1989, abandoned.

[30] Foreign Application Priority Data

| Nov. 1, 1988 | [JP] | Japan | 63-276622 |
| Nov. 1, 1988 | [JP] | Japan | 63-276623 |
| Nov. 1, 1988 | [JP] | Japan | 63-276624 |
| Sep. 29, 1989 | [JP] | Japan | 1-253861 |

[51] Int. Cl.$^5$ .............................................. G09G 3/00
[52] U.S. Cl. ................................. 345/211; 358/296; 346/107 R; 345/82
[58] Field of Search ............ 340/752, 762, 782, 811, 340/812; 341/136, 144, 147, 154; 346/160, 107 R, 108; 358/296

[56] References Cited

U.S. PATENT DOCUMENTS

| 3,947,840 | 3/1976 | Craford et al. | 340/782 |
| 4,607,248 | 8/1986 | Botka et al. | 341/144 |
| 4,897,639 | 1/1990 | Kanayama | 340/782 |
| 4,962,375 | 10/1990 | Hirane et al. | 340/762 |

FOREIGN PATENT DOCUMENTS

| 0074860 | 3/1983 | European Pat. Off. |
| 0283934 | 9/1988 | European Pat. Off. |
| 62-23627 | 1/1987 | Japan | 341/136 |

Primary Examiner—Jeffery Brier
Attorney, Agent, or Firm—Blum Kaplan

[57] ABSTRACT

A current supplying integrated circuit which has multi-output for controlling current supply from a current source to a plurality of elements to be driven, such as LEDs, and comprises a plurality of switching devices for controllably supplying the current from the source to the corresponding elements to be driven wherein each of the switching devices has N unit switching elements arranged to be connected in parallel to each other to form a current synthesizing circuit. The unit switching elements have substantially the same current capacity. Each of the elements to be driven, such as LEDs, is supplied with a current whose intensity can be varied by N degrees by the synthesizing circuit. By varying the current intensity supplied to each of the elements, the unevenness in properties among them can be avoided or suppressed in an effective and simplified manner.

70 Claims, 18 Drawing Sheets

OUTPUT-TRANSISTOR CONTROL CIRCUIT

OUTPUT TRANSISTORS

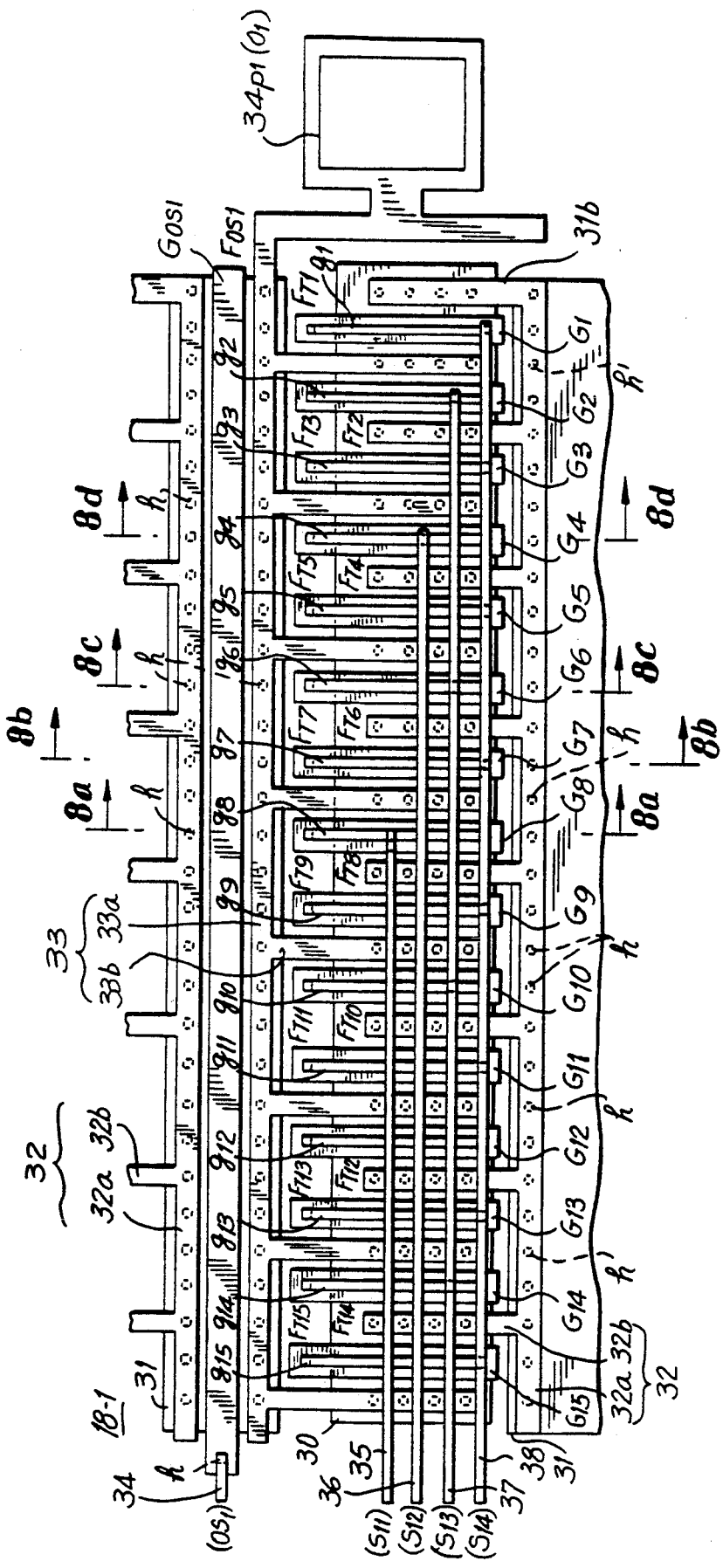

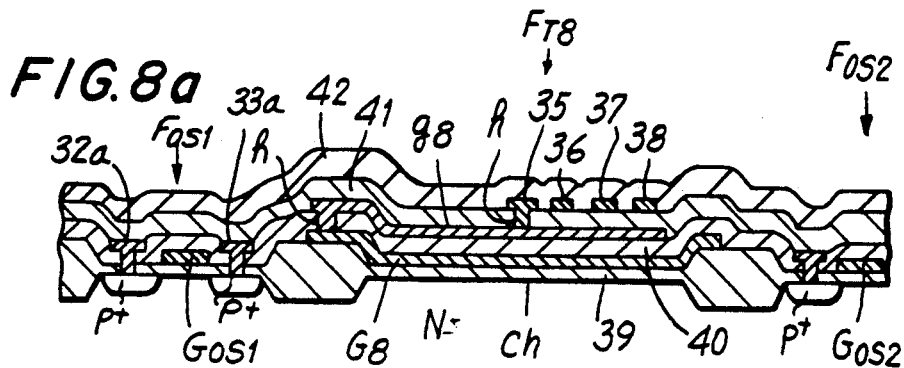
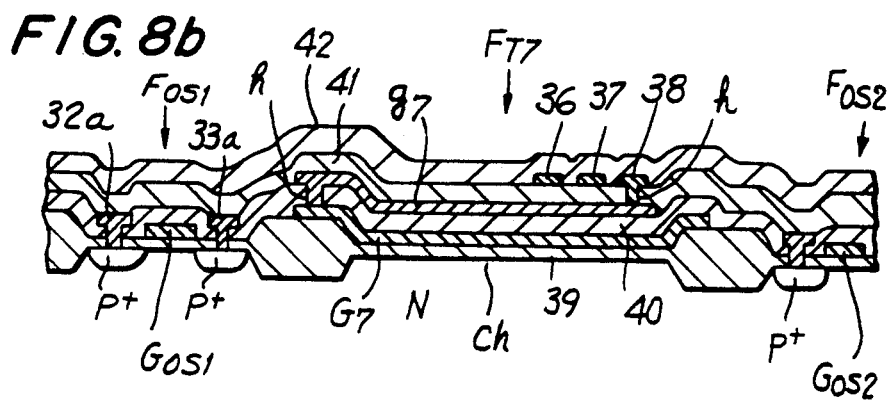
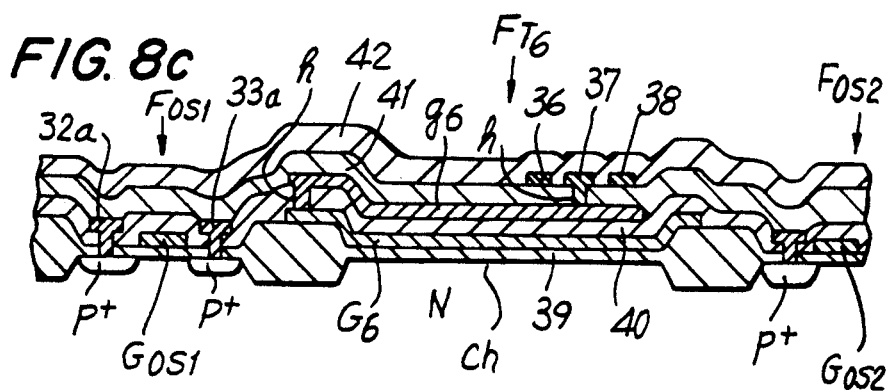
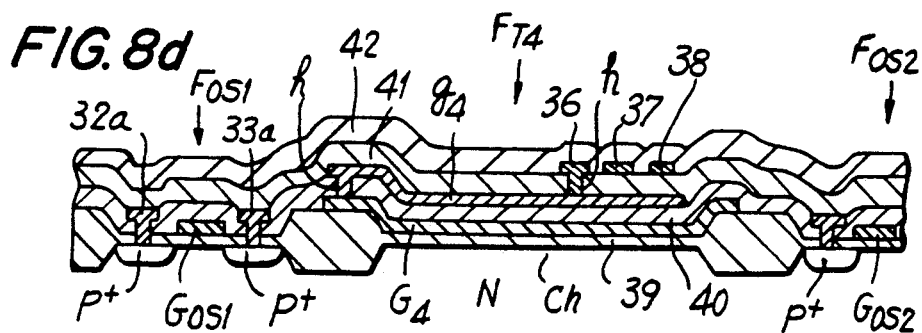

CURRENT-SUPPLYING INTEGRATED CIRCUIT

This is a continuation of application Ser. No. 07/430,174, filed Nov. 1, 1989, for CURRENT-SUPPLYING INTEGRATED CIRCUIT, now abandoned.

BACKGROUND OF THE INVENTION

This invention is directed to a current-supplying integrated circuit having multi-output which can be used in a printing device such as an LED printer or a thermal printer and, in particular, to a current-supplying integrated circuit which has a plurality of outputs for generating currents of varied strength to adjust the light strength for or the print density by each bit of the printing elements.

A conventional LED printer has an array of LEDs corresponding to a line to be printed, and the duration of each LED's emission is controlled so that desired print density can be obtained. A typical LED driving circuit provided in an LED printer is illustrated in FIG. 17. The driving circuit comprises a main frame 1, which includes, for example, a computer for generating data signals and the like, an integrated circuit 3 for driving an LED print head, and a ROM 4 for storing correction codes. The LED driving circuit also has a microprocessor 5 which, based on the data signals generated by main frame 1, controls integrated circuit 3 and ROM 4. Integrated circuit 3, which drives the LED print head, includes an output-transistor array 6 consisting of a plurality of field-effect transistors, each of which is connected to one LED of an LED-array integrated circuit 7. Integrated circuit 3 functions to control the period of emission of the individual LEDs so that variation in the quantity of emission among the LEDs can be corrected.

Microprocessor 5 in the LED driving circuit generates and delivers a control signal to ROM 4 on receiving the data signal for a line of print from main frame 1, so as to obtain correction code date from ROM 4. Microprocessor 5 then corrects the individual bits of the line of printing data in accordance with the correction code data to thereby produce a line of corrected printing data. The corrected data is supplied to the flip-flop constituting the least significant bit of a shift register 8. The data correcting operation is carried out such that the bits of the line of printing data are sequentially converted into corrected data consisting of three latch cycles, each latch cycle being adjusted in the duty ratio of the driving signal for the LED.

If, for example, the LED at the left side in LED array integrated circuit 7 has the lowest emission strength among the LEDs in FIG. 17, the emission strength correcting operation is carried out as follows. A correction code representing a value of 7 is stored beforehand in the ROM at an address corresponding to the left-side LED. Main frame 1 provides microprocessor 5 with a line of printing data including one bit for driving the left-side LED. Upon receiving this bit, microprocessor 5 generates and supplies a control signal to ROM 4 to obtain therefrom the line of printing data, including the correction code valued 7, for the left-side LED. In response to the line of printing data, microprocessor 5 produces a series of three-bit signals as corrected data signals and delivers them to shift register 8 in response to a latch signal.

Referring now to FIG. 18, the printing operation of the lth line is as follows. The data signal for the lth line is first converted into three blocks of corrected data signals $l_1$, $l_2$ and $l_3$. The first block of corrected data $l_1$ is stored in shift register 8 in response to a clock signal and is supplied from shift register 8 to the latch array 9 in response to the latch signal $L_1$. Since the first corrected data signal $l_1$ has the logically high bit corresponding to the left-side LED, the left-side latch is maintained logically high. In synchronization with the delivery of the latch signal $L_1$, microprocessor 5 delivers an enable signal having a pulse width of 4t to an output control circuit 10. Output control circuitry 10, which comprises an array of AND gates and voltage-level shift circuits (which are denoted simply as "AND" in FIG. 17), delivers a control ON signal to the left-side FET of transistor array 6 while the enable signal is being supplied from microprocessor 5. The left-side FET is shifted to on-state by the control ON signal and, during the on-state, permits current to pass from the power supply $V_{ss}$ to the left-side FET. Thus, the left-side LED is driven to emit light during the period of 4t. In turn, by the end of this 4t period, the second block of corrected data $l_2$ has already been supplied to the shift register 8. Therefore, the second block of data is latched by the latch circuit in response to the next latch signal $L_2$.

The second block of corrected data $l_2$ includes a logically high bit corresponding to the left-side LED, and so the left-side latch circuit is shifted to be logically high and generates a logically high signal $L_2$. The logically high signal $L_2$, as well as an enable signal having a pulse width of 2t, are delivered to output control circuit 10, which drives the left-side LED through the left-side FET to thereby light the LED for the 2t period of time. Likewise, the third block of corrected data $l_3$ has been stored in shift register 8 during the delivery of the enable signal of 2t width pulse. The third corrected data is latched by the latch circuit in response to the latch signal $L_3$. At this time, the left-side latch circuit is also maintained logically high. The latch signal $L_3$ and an enable signal having a pulse of 1t width are supplied to control circuit 10, so that the left-side FET is turned ON, which, in turn, makes the left-side LED emit for a 1t period.

As mentioned above, the enable signal includes the pulses 4t, 2t and 1t, each pulse being delivered to output control circuit 10 in response to one of the latch signals. In control circuit 10, the data signal is converted into three corrected data signals in a row in accordance with the blocks of corrected data $l_1$, $l_2$ and $l_3$.

In the above, as the left-side LED has the weakest emission strength and the correction data stored for it in ROM 4 is the maximum value ($=7$), the LED is controlled to emit intermittently for the entire 7t period of time. Likewise, in response to the stored values in ROM 4, the LEDs are controlled in their emitting periods from 1t to 7t incrementally, so that the emission strength of the respective LEDs are adjusted and, therefore, the printing densities produced by the LEDs of different emission strength are adjusted to the desired level.

As mentioned above, the integrated circuit for driving the LED printer head controls the emitting period of each LED to adjust the total emission quantity of each LED to a desired quantity in order to avoid printing unevenness due to variation in emission strength among the LEDs or due to variation in current-carrying capacity among the FETs forming the output transistor array. In other words, the FET's ON-time periods are controlled by seven degrees through the respective three-latch cycles. However, this means that the adjustment operation needs the printing period of three latch cycles for each line printing operation. The LED printer with this adjustment control can be increased in its printing speed by reducing the pulse width, but this adjustment is limited. In particular, an LED printer which has a large number of positions for a line of printing cannot easily achieve a desired high speed printing operation. In addition, it is necessary to produce a series of three blocks of corrected data in accordance with the enable signals for each line printing operation, which necessitates a complicated program or control of microprocessor 5.

Accordingly, a current supplying integrated circuit which is capable of adjusting variation in output strength among a plurality of elements to be driven by varying the current intensity supplied to each of the elements is desired.

SUMMARY OF THE INVENTION

Generally speaking, in accordance with the instant invention, a multi-output current supplying integrated circuit is provided such as an integrated circuit for driving an LED print head. The circuit has a plurality of switching means for controlling the current supply from the power supply to respective elements to be driven such as LEDs, wherein the switching means are provided with the elements to be driven, respectively. Each of the switching means includes a current synthesizing circuit which includes N unit-switching elements having substantially the same current capacity and which are connected in parallel with each other. According to the invention, N unit-switching elements are selectively energized to produce a current having N degrees of intensity, whereby the amount of current supply to the elements to be driven such as LEDs can be varied by N degrees (N+1 degrees if the current supply of zero is counted). Therefore, each of the elements to be driven is supplied with current of adjusted intensity so that the output capacity of each element to be driven can be adjusted to a desired value. Thus, in accordance with the invention, variation in output capacity among the elements to be driven, which are caused by variations in capacity among the elements to be driven or in current capacity among the switching means, can be avoided or at least reduced.

In another aspect of the invention, the above N unit-switching elements, included in each of the switching means, are divided into n groups, and each group of the unit-switching elements is controlled by each bit of an n-bit digital control signal. The i-th group of the unit-switching elements includes $2^{i-1}$ of the unit-switching elements, and, as a common control input to these unit-switching elements, the i-th bit of the control signal is provided therewith. "N" and "n" are positive integers and satisfy the following equation:

$$1 \leqq i \leqq n, \sum_{i=1}^{n} 2^{i-1} = 2^n - 1 = N$$

According to the arrangement of the unit-switching elements, the number of the control lines for the unit-switching elements can be reduced to be n which is much smaller than N. Thus, the control lines can be deposited easily on an integrated circuit. In contrast, if N unit-switching elements are controlled independently through individual control lines, the number of the control lines for each switching means becomes as much as N, and results in a lack of space in view of circuit configuration and of semiconductor layout. Each of the unit-switching elements, which has the current capacity as a quantitized unit of current output, can be made of a single field-effect transistor or of a parallel connection of two or more field-effect transistors. Each unit-switching element is normally made of a single field-effect transistor. However, in view of semiconductor layout, it is probable that the quantitized unit of current output (corresponding to resolution) is not obtained through a single field-effect transistor. In this case, each of the switching elements may be made of two or more field-effect transistors to increase the total amount of current capacity thereof to be the quantitized unit of current output.

In addition, output pads corresponding one by one to the switching means are normally arranged in a row, and so each switching means should be arranged between the adjacent output pads. In this case, it is preferable that N unit-switching elements are formed in a semiconductor substrate such that they are of the same shape and size, and are arranged along a line at the same intervals to form a unit-switching element array.

Where the unit-switching elements have the same current capacity, output-current intensity will increase in proportion to the number of the unit-switching elements to be driven. For instance, the current intensity doubles if four unit-switching elements are energized by the 4th bit of an n digital signal in comparison with that obtained by two unit-switching elements being energized by the 2nd bit of the digital signal. However, a plurality of the unit-switching elements cannot easily be made on a semiconductor substrate such that the elements have equal current capacity, owing to manufacturing inaccuracy, even if the elements are formed in the same shape and size. In the process of photolithography such as for forming gate electrodes of field-effect transistors, the resulting gate electrodes are inevitably different in their shapes, although the differences are small, due to manufacturing inaccuracy, which causes variation in current capacity among the field-effect transistors or unit-switching elements. Consideration must be made to this variation in current capacity among the switching elements, otherwise the output current intensity of each switching means cannot be expected to increase in proportion to the number of the unit-switching elements to be energized.

Where a plurality of unit-switching elements such as field-effect transistors are arranged in an array on a semiconductor substrate, the variation in the current capacity among the unit-switching elements shows monotonic characteristics along the array direction. A typical example is that the current capacity increases monotonically in the direction from the unit-switching element positioned at one end of the array of unit-switching elements to that positioned at the other end thereof. In this case, the unit-switching element positioned at the middle of the array has approximately an average current capacity, while those positioned at the left side of the array have lower current capacity and those at the opposite side have higher current capacity. If N unit-switching elements are divided into n groups, such that the unit-switching elements belonging to the first to the last n-th groups are positioned in this order from one end of the array to the other, an average current capacity of the unit-switching elements belonging to each group will differ among the groups. Thus, there is a possibility that the output current intensity will drop when energization of switching elements is shifted from one group to the adjacent group.

In order to avoid this defect, according to one aspect of the invention, there is provided a multi-output current supplying integrated circuit having an array of a plurality of switching elements which constitutes the switching means, wherein the switching elements are appropriately divided into n groups, each group forming each switching means, so that the variation in the current capacity existing among the switching elements because of manufacturing inaccuracy can be avoided or minimized. In a preferred embodiment, the first of n groups includes a single switching element which is situated at the middle of the array. The switching elements which are disposed one by one in the direction from the middle switching element to both ends of the array are divided into one of n groups in the following order which is symmetrical to the middle switching element:

when $n=2$, then $n \rightarrow 1 \rightarrow n$;
when $n=3$, then $n \rightarrow (n-1) \rightarrow n \rightarrow 1 \rightarrow n \rightarrow (n-1) \rightarrow n$;
when $n=4$, then $n \rightarrow (n-2) \rightarrow n \rightarrow (n-1) \rightarrow n \rightarrow 1 \rightarrow n \rightarrow (n-1) \rightarrow n \rightarrow (n-2) \rightarrow n$;
when $n=5$, then $n \rightarrow (n-3) \rightarrow n \rightarrow (n-2) \rightarrow n \rightarrow (n-1) \rightarrow n \rightarrow 1 \rightarrow n \rightarrow (n-1) \rightarrow n \rightarrow (n-2) \rightarrow n \rightarrow (n-3) \rightarrow n$; and
when $n=6$ or greater, then $n \rightarrow (n-1) \rightarrow n \rightarrow (n-2) \rightarrow n \rightarrow (n-) \rightarrow \ldots n \rightarrow 2 \rightarrow n \rightarrow \ldots \rightarrow n \rightarrow (n-2) \rightarrow n \rightarrow (n-1) \rightarrow n$.

According to the arrangement, the middle switching element belonging to the first group shows an average current capacity, and the average current capacity per one switching element belonging to the other groups also shows substantially the same value as that of the middle switching element of the first group. This assures that a digital value of the n-bit digital control signal corresponds linearly to the output current intensity which is generated by one of n groups energized when the n-bit digital signal is set to the above digital value even when variation in the current capacity exists among the switching elements arranged in the array. In addition, even if the switching elements have a current capacity which varies monotonically along the array, the output current intensity is at least expected to increase monotonically. The arrangement of the switching elements according to the invention allows for a current synthesizing circuit or digital-to-analog converter (DAC) without an undesirable drop of current intensity due to the variation in the current capacity among the switching elements arranged in an array structure.

In the above array of unit-switching elements, each unit-switching element can include one or more switching transistors, such as field-effect transistors. Where each of the switching elements includes two or more switching transistors, those transistors in one switching element can be positioned adjacent to each other or positioned such that other switching transistors forming other switching elements belonging to other switching means are interposed between them. More specifically, when each of the unit-switching elements includes two or more field-effect transistors positioned symmetrically in the array and connected in parallel with each other to form a parallel circuit, the array of unit-switching elements may be arranged such that the field-effect transistors forming one switching element belonging to one switching means are positioned between other field-effect transistors belonging to other switching means.

On the other hand, in the case that the current capacity of each of the unit-switching elements arranged in an array shows uneven characteristics along a curve having a turning point in the array direction, yet not a monotonically increasing curve or a monotonically decreasing curve as described above, the unit-switching elements are preferably arranged as follows wherein each of the unit-switching elements is constituted by two or more switching transistors. The two or more switching transistors belonging to the first group are arranged to have their center of gravity positioned in the center of the array. The switching transistors belonging to the respective groups are arranged so that the groups have at least two switching transistors, respectively, the centers of gravity of which appear in the direction from said center of gravity of the first group to both ends of the array in the following order, the order being expressed by the group numbers 1 to n to which the switching transistors belong:

when $n=2$, then $n \rightarrow 1 \rightarrow n$;
when $n=3$, then $n \rightarrow (n-1) \rightarrow n \rightarrow 1 \rightarrow n \rightarrow (n-1) \rightarrow n$;
when $n=4$, then $n \rightarrow (n-2) \rightarrow n \rightarrow (n-1) \rightarrow n \rightarrow 1 \rightarrow n \rightarrow (n-1) \rightarrow n \rightarrow (n-2) \rightarrow n$;
when $n=5$, then $n \rightarrow (n-3) \rightarrow n \rightarrow (n-2) \rightarrow n \rightarrow (n-1) \rightarrow n \rightarrow 1 \rightarrow n \rightarrow (n-1) \rightarrow n \rightarrow (n-2) \rightarrow n \rightarrow (n-3) \rightarrow n$; and
when $n=6$ or greater, then $n \rightarrow (n-1) \rightarrow n \rightarrow (n-2) \rightarrow n \rightarrow (n-) \rightarrow \ldots n \rightarrow 2 \rightarrow n \rightarrow \ldots \rightarrow n \rightarrow (n-2) \rightarrow n \rightarrow (n-1) \rightarrow n$.

According to this arrangement, as the switching transistors in one switching element are distributed in the array direction, the variation in current capacity among the switching elements can be suppressed. By comparison, in the case where the switching transistors belonging to the same switching elements are disposed adjacent to one another, the variation in current capacity among the switching elements cannot be suppressed. In particular, the variation can effectively be suppressed where the variation in current capacity among the switching transistors in the array direction exhibits a characteristic curve having a turning point around the center of the array. Thus, the linearity of current output in response to digital input can be greatly improved.

In a preferred embodiment, the switching means is provided with one or more offset field-effect transistors which have a relatively high current capacity compared to the switching transistors comprising the switching elements and which are common to all of the switching elements. With this configuration, output current intensity from each of the switching means can be modified by N steps of smaller changes without increasing the number of switching means.

In another aspect of the invention, there is provided an electronic device having the above-mentioned current supplying circuit. In addition, the present invention can also apply to a plasma display device wherein a DAC is used for tonal displaying.

Accordingly, it is an object of the present invention to provide an improved current-supplying integrated circuit having multi-output for controlling electronically-driven elements.

It is another object of the invention to provide a novel current supplying integrated circuit which is capable of adjusting variation in output strength among a plurality of elements to be driven by means of varying the current intensity supplied to each of the elements to be driven.

Another object of the present invention is to provide the above current supplying integrated circuit which comprises a plurality of switching elements corresponding to and driving respectively, the elements to be driven and wherein the switching elements can be controlled through the least number of controlling lines connected to them.

Yet another object of the present invention is to provide the current supplying integrated circuit with the above switching elements arranged in a row, wherein the current capacity among the switching elements can be equalized.

Still another object of the present invention is to provide an electronic device such as an LED printer, a plasma displaying device or the like, which is provided with the above current supplying circuits for the elements to be driven.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 7 is a plan view showing the semiconductor structure of the current synthesizing circuit of FIG. 1;

FIGS. 8a to 8d are sectional views taken along lines 8a—8a, 8b—8b, 8c—8c and 8d—8d in FIG. 7, respectively;

DETAILED DESCRIPTION OF THE PREFERRED EMBODIMENTS

Figure 1:
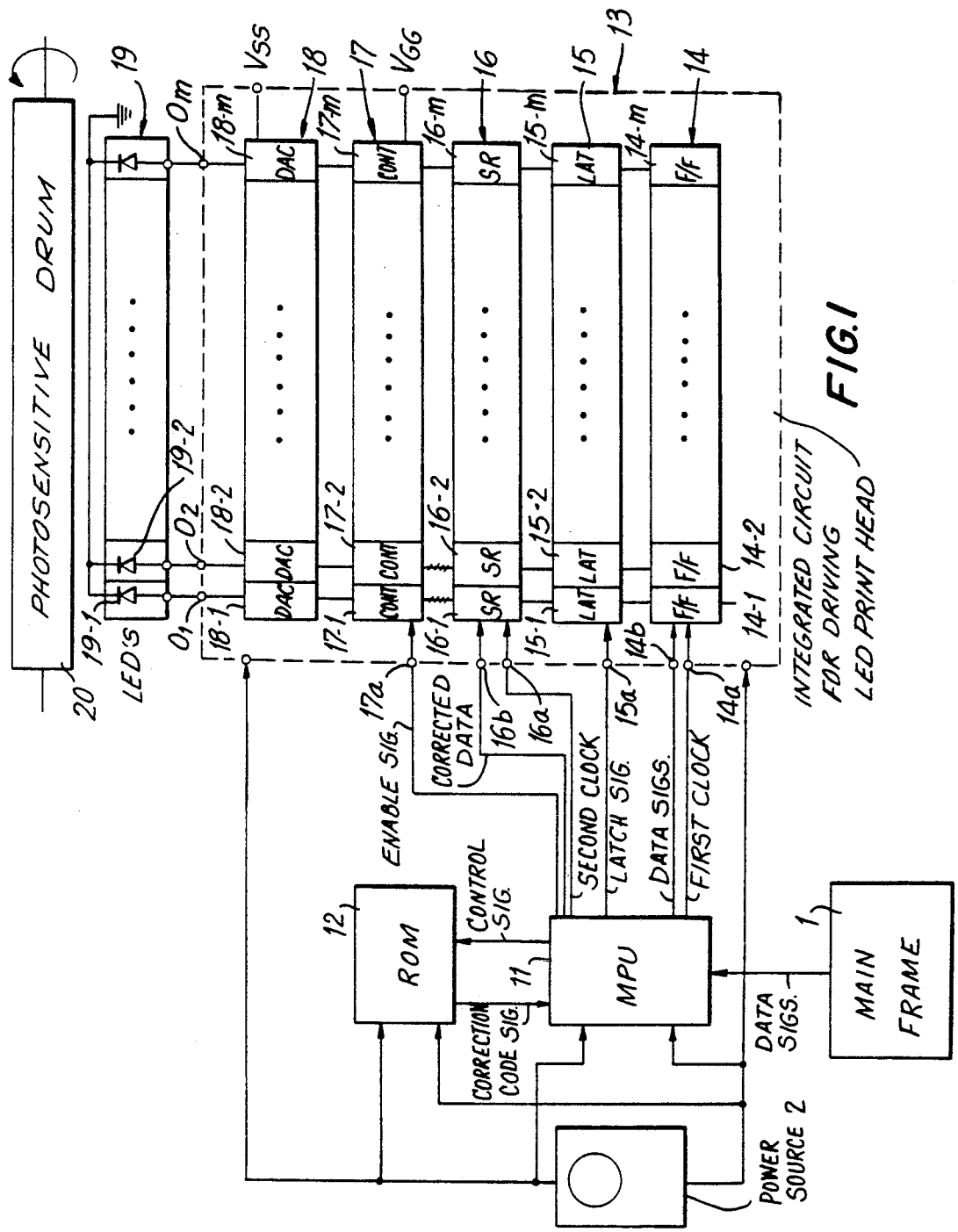
FIG. 1 is a schematic block diagram of a drive circuit for an LED printer, in which a multi-outlet current supplying integrated circuit according to the invention is provided.

Reference is made to FIG. 1 which illustrates a drive circuit for an LED printer in accordance with the invention. The drive circuit comprises a main frame 1 formed by a computer or other input device which supplies signals such as data signals to a microprocessor 11. Microprocessor 11 supplies control signals to a ROM (read only memory) 12 and receives from the ROM correction-code data. The correction-code data is stored in ROM 12 beforehand and is used for correcting the light-emission of LEDs forming a print head as described hereinafter. Microprocessor 11 also delivers data signals,, latch signals, correction data signals, enable signals and similar signals to an integrated circuit 13 for driving an LED print head.

Integrated circuit 13 includes a data shift register 14 which receives data signals for a line of printing via microprocessor 11 in response to a first clock signal from microprocessor 11, an array of latch circuits 15 for receiving the contents of the flip-flops (F/Fs) in data shift register 14 and storing them temporarily in response to the latch signal, and a correction-data shift register 16 for serial-parallel converting the correction data signals in response to a second clock signal to produce 4-bit digital signals. Integrated circuit 13 also includes an output-transistor control circuit 17 for generating gate signals in accordance with the 4-bit digital signals and the enable signals, and an output-transistor portion 18 having a plurality of switching circuits 18-1 to 18-$m$, these switching circuits being controlled by the gate signals.

An LED-array integrated circuit 19 comprises a plurality of LEDs 19-1 to 19-$m$, each connected to the corresponding switching circuits 18-1 to 18-$m$ of output-transistor portion 18, so that LEDs are supplied with electric current from a power source $V_{ss}$ to emit only when the corresponding switching circuits are in a turned on-state. A photosensitive drum 20 is disposed in front of the array of LEDs 19-1 to 19-$m$. A power source 2 for the device is also provided.

Figure 2:
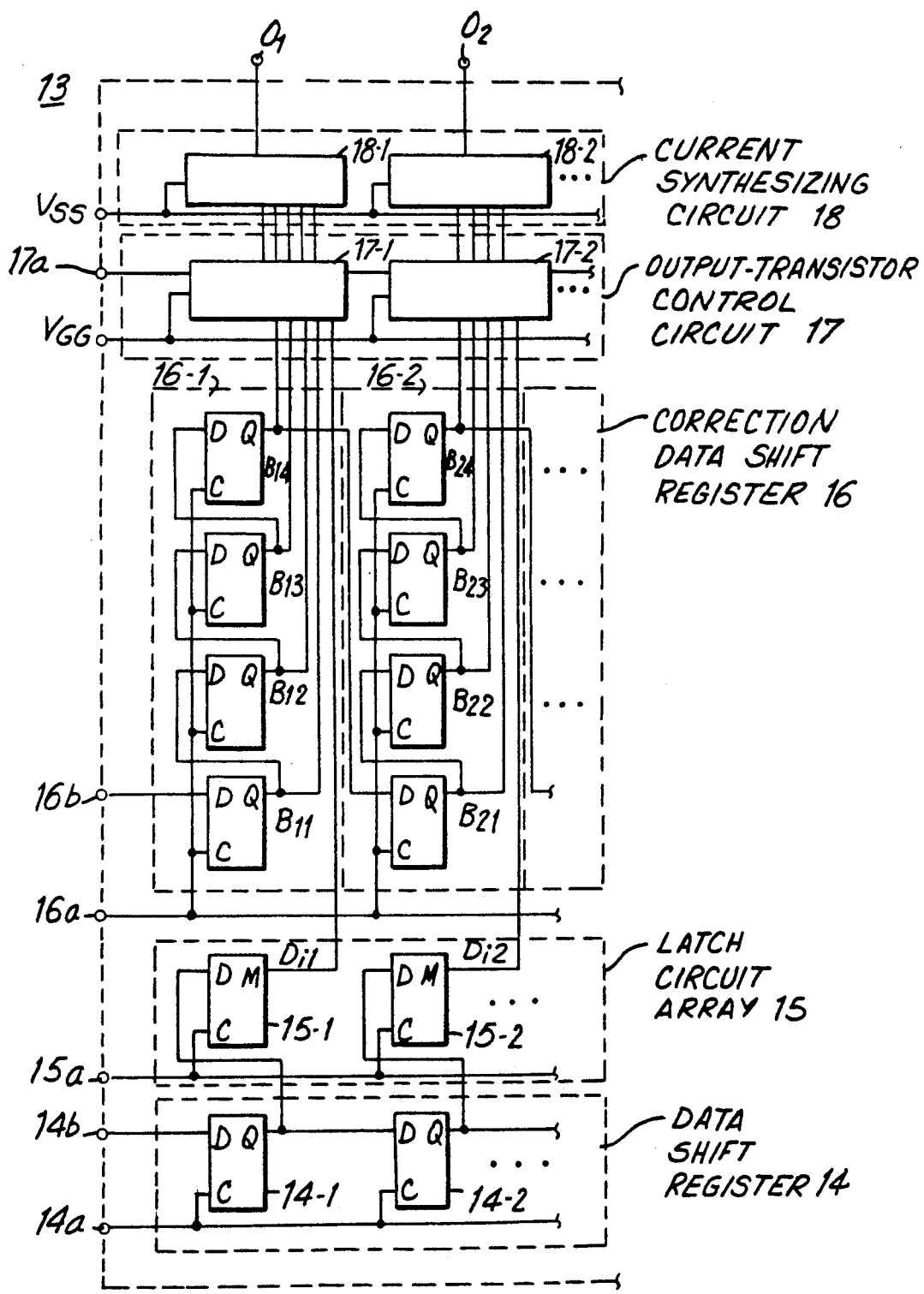
FIG. 2 is a detailed block diagram of the drive circuit for the LED printer of FIG. 1.

FIG. 2 illustrates drive circuit 13 for the LED print head. Data shift register 14 includes D-type flip-flops 14-1 to 14-$m$. Each time the first clock pulse is supplied to the first clock terminal 14a, and therefore to the C-input of each flip-flop, binary serial data on the data terminal 14b of each flip-flop is shifted to the next flip-flop of the higher stage. With the shifting operation, the serial data for a line of printing are converted into parallel data. The array of latch circuits 15 includes latch circuits 15-1 to 15-m of D-flip-flops which store temporarily the contents of corresponding bits of shift register 14 in response to the latch synchronization signal being input to the latch terminals 15a of latch circuits 15-1 to 15-m.

Correction-data shift register 16 includes 4m of D flip-flops, each flip-flop having correction-data input D which receives correction data in the form of binary-4m-bit serial data and shifts the input correction data into the next upper flip-flop in response to the second clock signal supplied to its second clock terminal 16a. The correction data is initially applied to correction-data terminal 16b and shifted through the four D flip-flops of partial shift register 16-1, and then to the first flip-flop of partial shift register 16-2. More specifically, correction-data shift register 16 includes m partial shift registers, each including four D flip-flops and generating 4-bit parallel signals (such as $B_{14}$, $B_{13}$, $B_{12}$ and $B_{11}$) for correcting the emission intensity of the corresponding LED. Output-transistor control circuit 17 also includes m unit-circuit portions, each unit-circuit portion including control and level-shifting circuits. Each of the control and level-shifting circuits receives data (such as $D_{i1}$) output from the corresponding latch circuit of the latch-circuit array 15 and, at the same time, receives 4-bit serial correction data (such as $B_{14}$, $B_{13}$, $B_{12}$ and $B_{11}$) from the corresponding partial shift register of correction-data shift register 16. The control and level-shifting circuits then deliver 4-bit serial gate control signals to the corresponding current synthesizing circuits (described below), respectively, in response to the enable signal being input to the enable terminals 17a.

Figure 3:
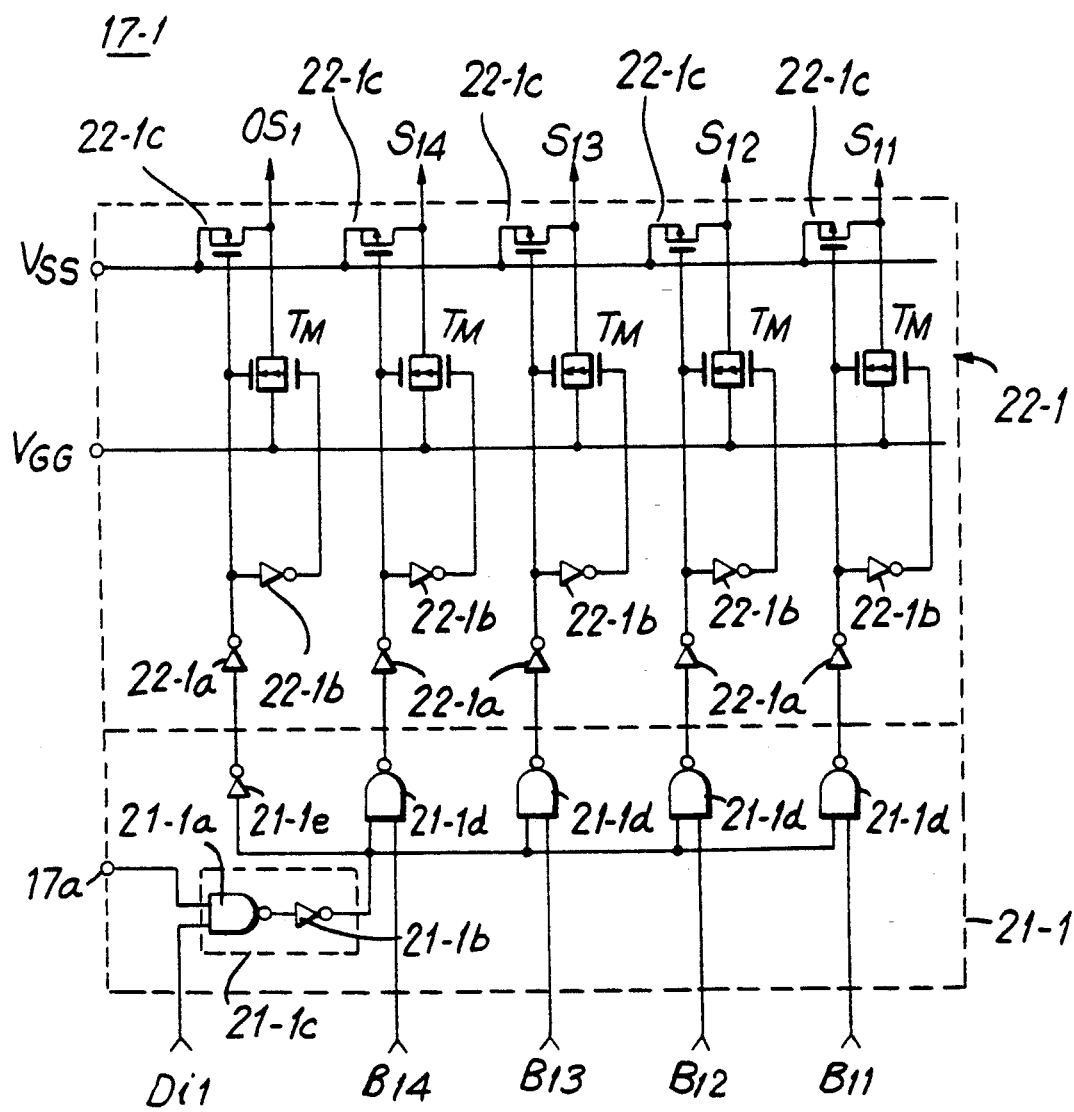
FIG. 3 illustrates, in detail, the control and level-shifting circuit of FIG. 1.

Referring to FIG. 3, the control and level-shifting circuit 17-1 of the output-transistor control circuit 17 is illustrated. The remaining circuits 17-2 to 17-m are of the same circuit structure as the circuit 17-1. Control and level-shifting circuit 17-1 includes a logic control circuit portion 21-1 and a level shifting circuit 22-1. In the present embodiment, the data signal $D_{i1}$ from latch circuit array 15-1 is set to be logically high where printing operation is requested, whereas $D_{i1}$ is set to be logically low where printing operation is not requested. In addition, the enable signals applied to terminal 17-a are set to be logically high for defining a printing period, while they are set to be logically low for defining a non-printing period.

Logic control circuit 21-1 includes a print mode decision circuit 21-c which comprises a NAND gate 21-1a for receiving the enable signals and the data signals $D_{i1}$ and an inverter 21-1b serially connected to the NAND gate in order to set the LED 19-1, corresponding to the control and level-shifting circuit 17-1, to be selectively on or off. Logic control circuit 21-1 also includes four NAND gates 21-1d and four inverters 21-1e. Each NAND gate 21-1d receives one of the 4-bit serial signals $B_{14}$, $B_{13}$, $B_{12}$ and $B_{11}$, respectively, as correction data and the print mode signal from print mode decision circuit 21-1c, and produces a 4-bit digital signal which is supplied through level shifting circuit 22-1 to a digital-to-analog converter of the current synthesizing circuit (described below). Inverter 21-1e inverts the print mode signal.

Control and level-shifting circuit 17-1 includes five level shifting circuits 22-1 of the same structure for producing an offset gate control voltage $OS_1$ and gate control voltages $S_{14}$, $S_{13}$, $S_{12}$ and $S_{11}$ for the DAC. Each of the level shifting circuits includes an inverter 22-1a for inverting the output signal from the associated inverter 21-1e or the associated one of NAND gates 21-1d, a transmission gate $T_M$ for receiving the inverted output signal and the output signal from the inverter 22-1b as control inputs and for delivering an external gate bias voltage $V_{GG}$, and a P-channel MOSFET 22-1c for setting the output of the transmission gate $T_M$ when in the state of being off to be the same voltage as the external source voltage $V_{ss}$.

Print mode decision circuit 21-1c generates the print mode signal which is converted into the offset control signal $OS_1$ whose voltage varies between the external gate bias voltage $V_{GG}$ and the external source voltage $V_{ss}$. The outputs of NAND gates 21-1d are also converted into the DAC control signals $S_{14}$, $S_{13}$, $S_{12}$ and $S_{11}$ each having a voltage between the above range, respectively.

Figure 4:
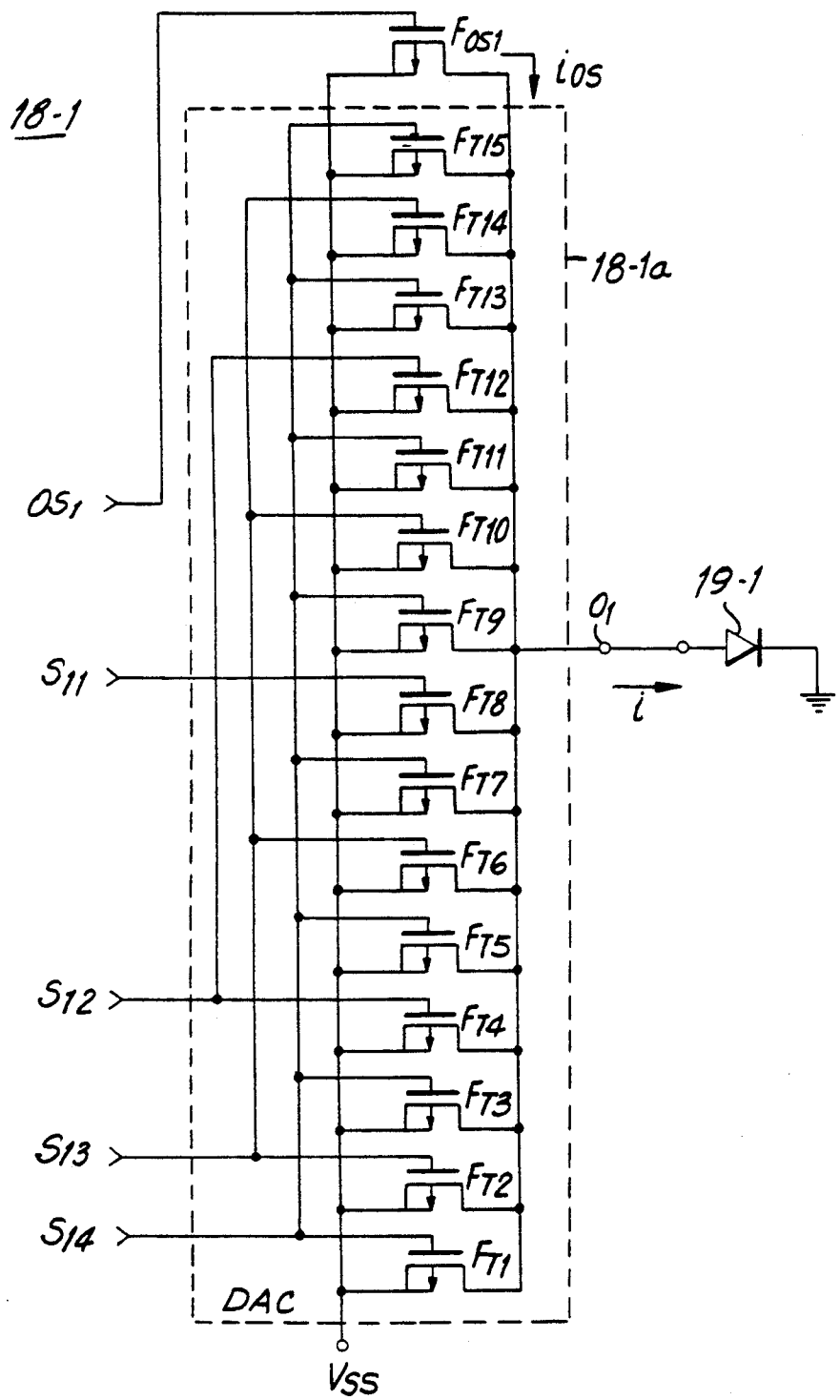
FIG. 4 illustrates, in detail, the current-synthesizing circuit of FIG. 1.

FIG. 4 illustrates the current synthesizing circuits or the switching circuits 18-1 of output-transistor portion 18 shown in FIG. 2. Each of current synthesizing circuits 18-1 to 18-m includes a digital-to-analog converter and a field-effect transistor for offsetting. Current synthesizing circuit 18-1 shown in FIG. 4 includes a current-output-type digital-to-analog converter 18-1a in the form of a parallel connection of fifteen p-channel field-effect transistors $F_{T1}$ to $F_{T15}$ having the same current capacity and a single p-channel field-effect transistor $F_{os1}$ having a current capacity which is one-third of the total current capacity of the field-effect transistors $F_{T1}$ to $F_{T15}$. Of these, one transistor $F_{T8}$ is supplied with the control signal $S_{11}$ as a gate signal, two transistors $F_{T4}$ and $F_{T12}$ with the control signal $S_{12}$, four transistors $F_{T2}$, $F_{T6}$, $F_{T10}$ and $F_{T14}$ with the control signal $S_{13}$, and the remaining eight transistors $F_{T1}$, $F_{T3}$, $F_{T5}$, $F_{T7}$, $F_{T9}$, $F_{T11}$, $F_{T13}$ and $F_{T15}$ with the control signal $S_{14}$. Thus, the transistors are set to be on when the corresponding control signals are set to a low level. Current synthesizing circuit 18-1 is formed on a semiconductor substrate, the structure of which will be described hereinafter.

Figure 5:
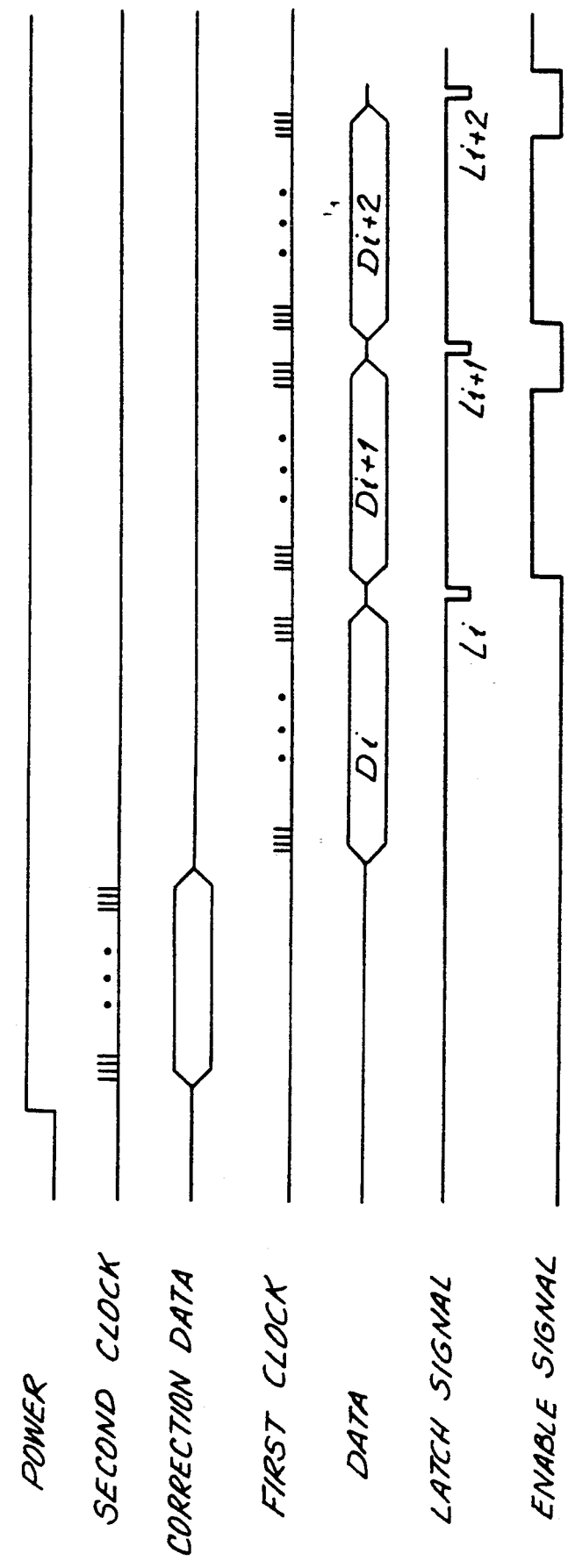
FIG. 5 is a time chart showing the operation performed by the drive circuit in FIG. 1.

The operation of the above mentioned embodiment will now be described with reference to FIG. 5. A voltage from power supply 2 is applied to the device. Then, microprocessor 11 delivers the control signal to ROM 12 which, in turn, provides microprocessor 12 with the correction code data signals. Microprocessor 12 delivers the received correction code data signals along with the second clock signal to correction-data shift register 16. In the present embodiment, a line of print comprises m dots, and so the correction-code data signal is in the form of 4m-bit serial digital signal, each 4 bits thereof representing correction data for one dot. Microprocessor 11 generates the correction data signals and the second clock signal only for a predetermined period of time from the application of the power. The serial digital signals of 4-bit are inputted into the D flip-flop of the least significant bit of shift register 16 in response to each pulse of the second clock signal. Thus, after 4m pulses of the second clock signal are generated, the serial digital signals of 4m bits have been stored in shift register 16. Since microprocessor 11 does not thereafter generate the second clock signal, the serial digital signals or correction data are maintained in shift register 16. For example, partial shift register 16-1 of shift register 16 is maintained such that the first bit of $B_{11}$, the second bit of $B_{12}$, the third bit of $B_{13}$, and the fourth bit of $B_{14}$, representing the 4-bit signal (corresponding to 1-dot correction data), appear on the output terminals thereof.

After the correction data signal is stored in shift register 16, the first clock signal is generated and, in response to that, the data signals are delivered to data shift register 14 via microprocessor 11. Where one line print data is $D_i$ for the i-th line to be printed, the data $D_i$ are stored in data shift register 14 by the generation of m pulses of the first clock signal. Microprocessor 11 then generates the latch signal $L_i$ and delivers it to the array of latch circuits 15. In response to the latch signal, the latch circuits 15-1 to 15-m receive and retain therein the outputs (the data $D_i$) of the corresponding D flip-flops 14-1 to 14-m. Thus, the data $D_{i1}$ to $D_{im}$ appear on the outputs of latch circuits 15-1 to 15-m.

Next, the printing operation of the LEDs will be explained by taking LED 19-1 as an example. The enable signal turns to be logically high and then it is decided as to whether LED 19-1 is driven to emit or not according to the level of the data signal $D_{i1}$. That is, where the data signal $D_{i1}$ is logically high, print mode decision circuit 21-1c outputs a logically high signal, while where the signal $D_{i1}$ is logically low, circuit 21-1c outputs a logically low signal. Where the output of circuit 21-1c is high, the transmission $T_M$ is energized to pass the gate bias voltage $V_{GG}$ as the signal $OS_1$ therethrough to the p-channel field-effect transistor $F_{os1}$ which, in turn, is energized. At the same time, the correction data signals in the form of $B_{14}$, $B_{13}$, $B_{12}$ and $B_{11}$ are supplied to control and level-shifting circuits 17-1. Where the data signal $B_{14}$ is high and the data signals $B_{13}$, $B_{12}$ and $B_{11}$ are low, the signal $S_{14}$ is set to be the gate bias voltage $V_{GG}$ while the signals $S_{13}$, $S_{12}$ and $S_{11}$ are set to be the source voltage $V_{SS}$. In this case, of the transistors of DAC 18-1a, $F_{T1}$, $F_{T3}$, $F_{T5}$, $F_{T7}$, $F_{T9}$, $F_{T13}$ and $F_{T15}$ are set to be off. In the present embodiment, the field-effect transistor $F_{os1}$ has the current capacity of $i_{os}$, and each transistor of DAC 18-1a has that of $i_o$ and, therefore, the current value applied from the output terminal $O_1$ to LED 19-1 becomes $(i_{os}+8i_o)$ where only the signal $S_{14}$ is set to be the gate bias voltage $V_{GG}$. Depending on the signals $S_{14}$, $S_{13}$, $S_{12}$ and $S_{11}$, the current value applied to LED 19-1 varies from $i_{os}$ to $(i_{os}+15\,i_o)$:

$$i_{os} \leq i \leq i_{os}+15\,i_o \qquad (1)$$

Accordingly, by preparing the correction code data which represent the current values supplied to the LEDs for adjusting the emission intensity of the LEDs to be a desired one, and storing them in the ROM beforehand, all of the LEDs can be adjusted in their emission intensity to be a desired one, whereby unevenness of printing by the LEDs can be avoided or suppressed. In addition, since the unevenness of printing can be suppressed by varying the current value supplied to each of the LEDs, one line of printing can be performed by one latch cycle. This enables the printing speed to be faster. In fact, according to the present embodiment, the printing speed becomes three times as fast as that of the conventional print head. Furthermore, since the data signals do not need to be modified but just transferred, and the correction data signals are stored in shift register 16 only one time whereby the current values to be supplied to the LEDs are established, the programming and control for microprocessor 11 can be simplified.

Moreover, each dot of one line of printing can be controlled independently, by either modifying the correction code data for each dot prestored in the ROM or directly supplying desired correction code data as required.

The effect of the provision of the p-channel field-effect transistor for offsetting is as follows. The unevenness of emission-strength among the LEDs is expected to be approximately in the range of 20%. Each of the LEDs emits in proportion to the current intensity supplied thereto. Thus, the offset-transistor $F_{os1}$ is provided to supply the current to the LEDs, the value of the current being the minimal value required to supply to each of the LEDs for emission, so that only the unevenness of the emission, that is, about 20% of emission intensity, is to be modified by DAC 18-1a. According to the invention, the unevenness of the emission intensity among the LEDs can be suppressed in the range of about 1%.

Figure 6:
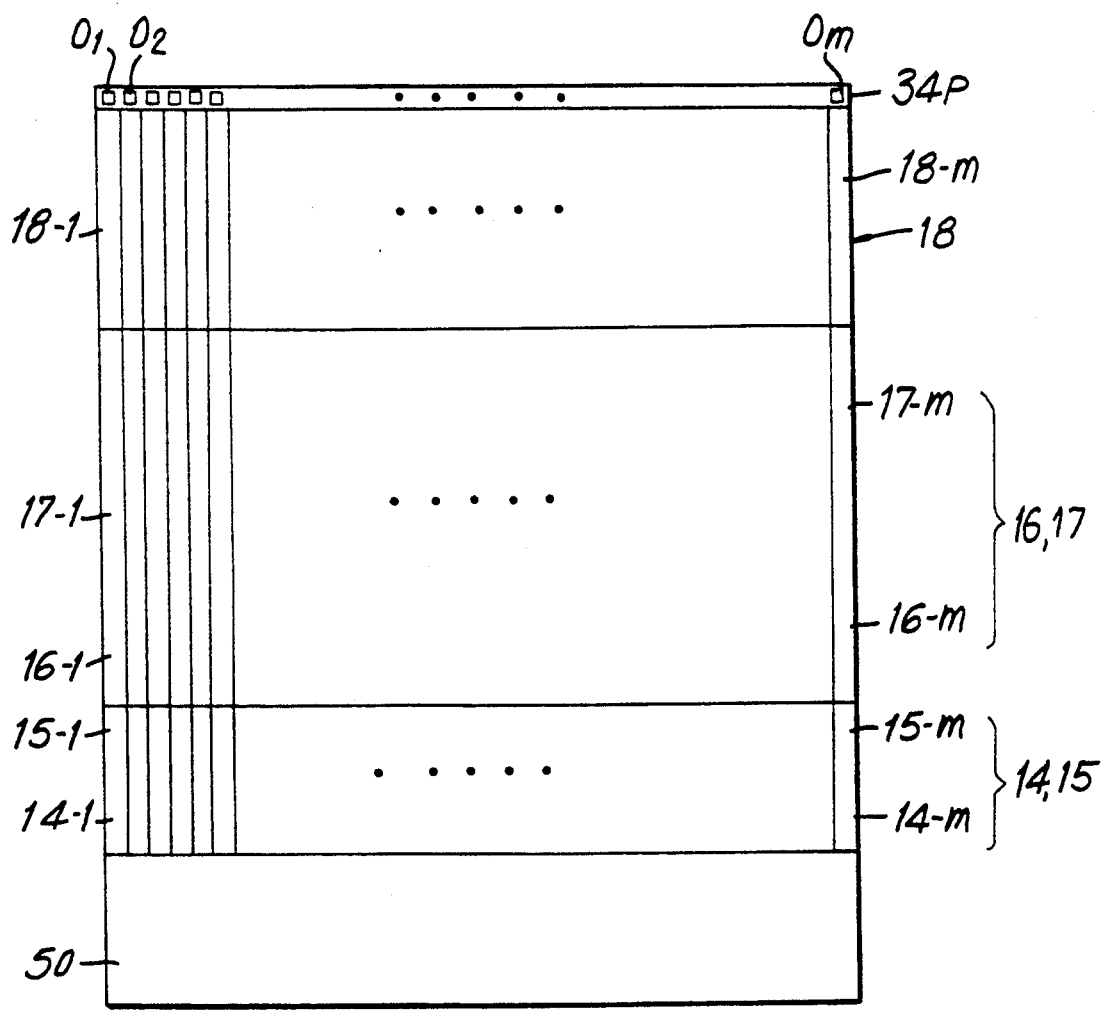
FIG. 6 is a schematic plan view illustrating a chip-layout of the drive circuit for the LED printer of FIG. 1.

FIG. 6 illustrates an example of a layout of the drive circuit for an LED print head on a semiconductor chip. As shown in the drawing, the integrated circuit chip is mainly divided into the following portions: A logic portion 50; data shift register and latch circuit-array portion 14, 15 wherein D flip-flops 14-1 to 14-m and latch circuits 15-1 to 15-m are arranged in two rows; a correction-data shift register and output-transistor portion 16, 17 wherein partial shift registers 16-1 to 16-m and control and level-shifting registers 17-1 to 17-m are arranged in two rows; an output-transistor portion 18 consisting of current synthesizing circuits 18-1 to 18-m arranged in a line; and a pad portion $34_p$ wherein output terminals $O_1$ to $O_m$ corresponding to respective current synthesizing circuits 18-1 to 18-m are disposed.

Referring now to FIG. 7, the semiconductor structure of current synthesizing circuit 18-1 shown in FIG. 4 will be described. As can be seen, current synthesizing circuit 18-1 includes fifteen field-effect transistors $F_{T1}$ to $F_{T15}$ which are of the same shape and size and are formed on a substrate such that they are arranged in a row at the same intervals. More specifically, the transistors have strips of polysilicon gates $G_1$ to $G_{15}$ arranged in a row at the same intervals. Except for the region below the gates $G_1$ to $G_{15}$, an active region 30 is extended along the array of the gates $G_1$ to $G_{15}$. Active region 30 can be formed by means of self-alignment using the polysilicon gates $G_1$ to $G_{15}$ as a mask for ion-injection. The channel length of the transistors is defined by the width of the polysilicon gates $G_1$ to $G_{15}$, and its width is defined by the width of active region 30. The offsetting p-channel field-effect transistor $F_{os1}$ has a polysilicon gate $G_{os1}$ which is extended in the form of a strip along the array of transistors $F_{T1}$ to $F_{T15}$. Active region 31 of this transistor $F_{os1}$ is extended in the direction of the array of $F_{T1}$ to $F_{T15}$ and is along the polysilicon gate $G_{os1}$. A source electrode line 32 applied with the source bias voltage $V_{ss}$ comprises a common electrode line 32a and eight source electrodes 32b. Common electrode line 32a is electrically connected to the p-type source region of offsetting active region 31 through a number of contact holes h arranged at the same intervals. Source electrodes 32b are extended transversely from common electrode line 32a at the same intervals and are parallel to each other. Likewise, a drain electrode line 33 comprises a common electrode line 33a and eight drain electrodes 33b. Common electrode line 33a is electrically connected via a number of contact holes h disposed at the same intervals to the p-type drain area of offsetting active region 31 which is connected to a rectangular bonding pad $34_{p1}$ forming the output terminal $O_1$. Drain electrodes 33b are extended transversely from common electrode line 33a at the same intervals and are parallel to each other. The polysilicon gate $G_{os1}$ for offsetting has one end which is electrically connected to offset gate line 34 supplied with the gate signal $OS_1$ via a contact hole h. The polysilicon gate $G_8$ of the transistors $F_{T8}$ positioned at the middle of the transistor-array is connected to a first gate line 35 supplied with the gate signal $S_{11}$, the gates $G_4$ and $G_{12}$ to a second gate line 36 supplied with the signal $S_{12}$, the gates $G_2$, $G_6$, $G_{10}$ and $G_{14}$ to a third gate line 37 supplied with a signal $S_{13}$, and the gates $G_1$, $G_3$, $G_5$, $G_7$, $G_9$, $G_{11}$, $G_{13}$ and $G_{15}$ to a fourth gate line 38 supplied with the signal $S_{14}$, respectively.

Referring to FIGS. 8a to 8d, the connecting structure between the first to the fourth gate lines 35 to 38 and the transistors will be described. As shown in FIG. 8a illustrating the connecting structure between the transistor $F_{T8}$ and first gate line 35, the transistor $F_{T8}$ includes a channel region Ch formed between the p-type source and drain region formed on the n-type semiconductor substrate by diffusion, and the polysilicon gate $G_8$ formed on gate oxide film 39 deposited on the surface of the substrate. On the polysilicon gate $G_8$, an insulating layer 40 is disposed on which a first-layer line $g_8$ is deposited. The first-layer line $g_8$ is electrically connected via a contact hole h to the polysilicon gate $G_8$ and is also connected via another contact hole h to first gate line 35 which is a second-layer line and is formed on an insulating layer 41. The polysilicon gate $G_7$ of transistor $F_{T7}$ which is adjacent to the right side of the transistor $F_{T8}$ in FIG. 7 is electrically connected via a contact hole h to a first-layer line $g_7$ formed on insulating layer 40. The first-layer line $g_7$ is electrically connected via a contact hole h to a second-layer line forming the fourth gate line 38, as shown in FIG. 8b. Likewise, the polysilicon gate $G_6$ of the transistor $F_{T6}$ is connected to a second-layer line forming third gate line 37 via a contact hole h, a first-layer line $g_6$ and the contact hole h in this order, as shown in FIG. 8c, while the polysilicon gate $G_4$ is connected to a second-layer line forming second gate line 36 via a contact hole h, a first-layer line $g_4$ and the contact hole h in this order, as shown in FIG. 8d. Also provided is a protecting layer 42.

The relationship between gate lines 35 to 38 (signals $S_{11}$ to $S_{14}$) and the transistors $F_{T1}$ to $F_{T15}$ is shown in Table 1 below:

TABLE 1

| Transistor | $S_{11}$ | $S_{12}$ | $S_{13}$ | $S_{14}$ | Bit No. |
| --- | --- | --- | --- | --- | --- |
| $F_1$ |  |  |  | ◯ | 4 (n) |
| $F_2$ |  |  | ◯ |  | 3 (n-1) |
| $F_3$ |  |  |  | ◯ | 4 (n) |
| $F_4$ |  | ◯ |  |  | 2 (n-2) |
| $F_5$ |  |  |  | ◯ | 4 (n) |
| $F_6$ |  |  | ◯ |  | 3 (n-1) |
| $F_7$ |  |  |  | ◯ | 4 (n) |
| $F_8$ | ◯ |  |  |  | 1 |
| $F_9$ |  |  |  | ◯ | 4 (n) |
| $F_{10}$ |  |  | ◯ |  | 3 (n-1) |
| $F_{11}$ |  |  |  | ◯ | 4 (n) |
| $F_{12}$ |  | ◯ |  |  | 2 (n-2) |
| $F_{13}$ |  |  |  | ◯ | 4 (n) |
| $F_{14}$ |  |  | ◯ |  | 3 (n-1) |
| $F_{15}$ |  |  |  | ◯ | 4 (n) |

◯: connected

Figure 9:
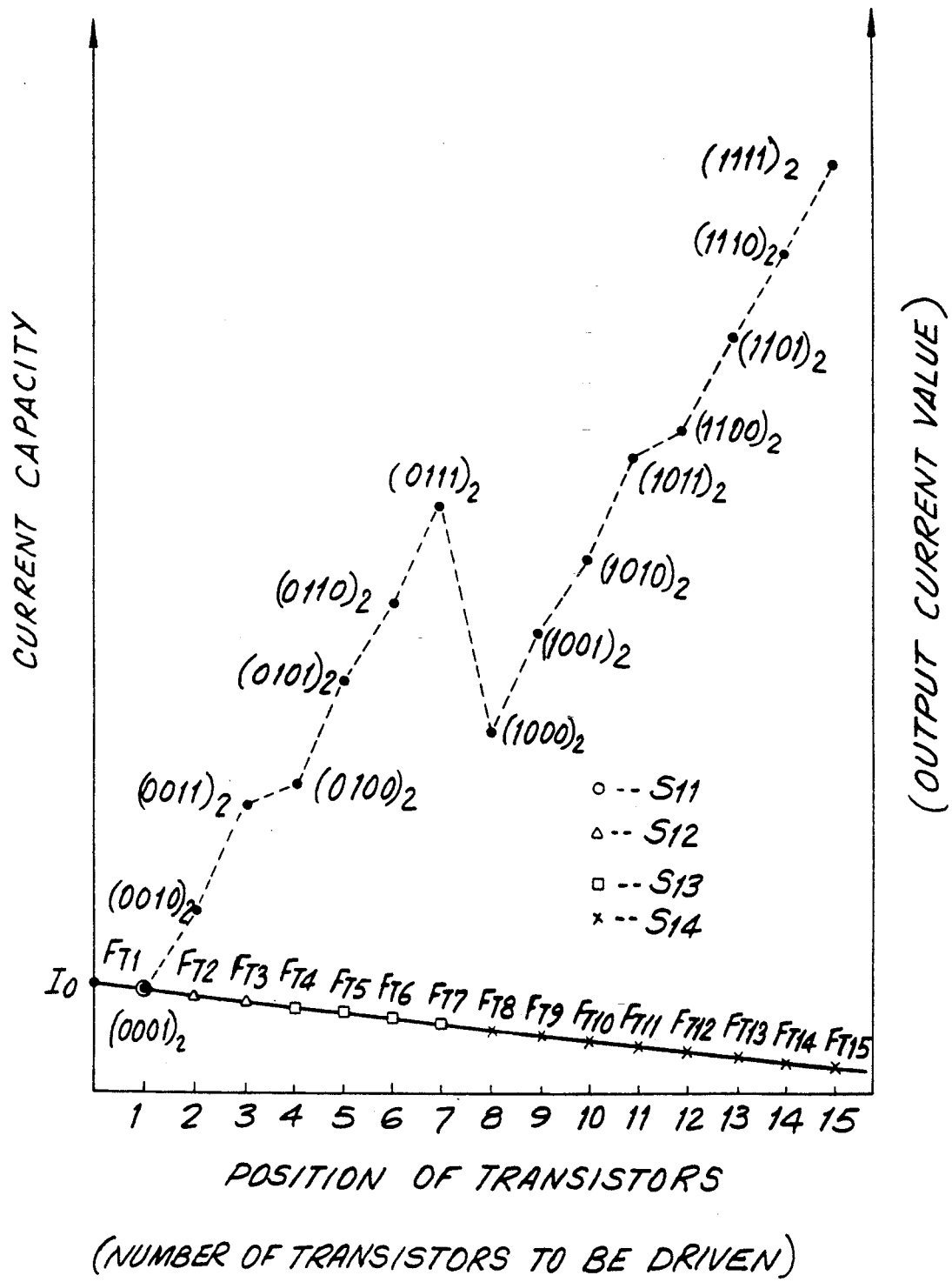
FIG. 9 illustrates a characteristic line showing the variation in current capacity of the switching transistors arranged in an array on a semiconductor substrate, together with characteristics of output current shown by the broken line with respect to digital input signal.

As shown in Table 1, the transistor $F_{T8}$ is connected to first gate line 35 which is supplied with the signal $S_{11}$ of the first bit of the 4-bit serial signal. This transistor is positioned in the center of the transistor-array. The transistors $F_{T4}$ and $F_{T12}$ are connected to second gate line 36 which is supplied with the signal $S_{12}$ or the second bit of the 4-bit serial signal, these transistors being positioned symmetrically with respect to the middle transistor $F_{T8}$ in the transistor-array. The transistors $F_{T2}$, $F_{T6}$, $F_{T10}$ and $F_{T14}$ are connected to third gate 37 which is supplied with the signal $S_{13}$ or the third bit of the 4-bit serial signal. The transistors $F_{T6}$ and $F_{T10}$ are also positioned symmetrically with respect to the middle transistor $F_{T8}$ in the transistor-array, and the other two transistors $F_{T2}$ and $F_{T14}$ are positioned symmetrically with respect to the middle transistor. The transistors $F_{T1}$, $F_{T3}$, $F_{T5}$, $F_{T7}$, $F_{T9}$, $F_{T11}$, $F_{T13}$ and $F_{T15}$ are connected to fourth gate line 38 which is supplied with the signal $S_{14}$ or the fourth bit of the 4-bit serial signal. The transistors $F_{T1}$ and $F_{T15}$, $F_{T3}$ and $F_{T13}$, $F_{T5}$ and $F_{T11}$, and $F_{T7}$ and $F_{T9}$ are positioned symmetrically with respect to the middle transistor $F_{T8}$ in the transistor-array, respectively. The advantage of the symmetrical arrangement of the transistors with respect to the middle transistor $F_{T8}$ is as follows.

Where the transistors $F_{T1}$ to $F_{T15}$ are formed on a semiconductor substrate so that they are of the same shape and size and are arranged in a row at the same intervals, the transistors are expected to have the same current capacity. Unfortunately, it has been experienced that in the semiconductor manufacturing process such as plasma etching for manufacturing polysilicon gates $G_1$ to $G_{15}$, unevenness in the current capacity of the transistors is introduced due to the unevenness in the shape of the gates and inaccuracy of mask alignment, among other factors. It also has been observed that the unevenness in the current capacity among the transistors arranged in a row exhibits monotonic characteristics in the direction of arrangement thereof and a typical monotonic characteristic is linear as shown by the solid line in FIG. 9, wherein the current capacity of the transistors decreases linearly in the direction from the transistor $F_{T1}$ at one end of the transistor-array to the transistor $F_{T15}$ at the other end thereof. If the transistor $F_{T1}$ is controlled by the signal $S_{11}$, the transistors $F_{T2}$ and $F_{T3}$ by the signal $S_{12}$, the transistors $F_{T4}$, $F_{T5}$, $F_{T6}$ and $F_{T7}$ by the signal $S_{13}$, and the remaining transistors $F_{T8}$, $F_{T9}$, $F_{T10}$, $F_{T11}$, $F_{T12}$, $F_{T13}$, $F_{T14}$ and $F_{T15}$ by the signal $S_{14}$, respectively, the change in output current value does not increase monotonically as shown by the broken line. More specifically, in this arrangement, since the transistors are of p-type, the gate signal represents binary '1' by its logically low level and binary '0' by its logically high level. As the 4-bit serial signal increases in its value from '00001' to '0111', the output current value is monotonically increased as shown by the broken line in FIG. 9. However, since the output current value is much lower when the signal is '1000' than when the signal is '0111', the monotonic increase in the current value is broken at this point. In other words, the maximum drop of the output current value occurs when the signal increases from '0111' to '1000'. In addition, since the gradient of the current capacity line shown in FIG. 9 is rather large, the current values at the points where the 4-bit signal is '1001' and '1010' are lower than that where the signal is '0111'.

As described above, the unevenness in the current capacity among transistors causes the drop in the output current value of the DAC, which deteriorates the monotonic change in the output current value partially. Consideration is made as to accepted unevenness in the current capacity among the transistors in order to avoid the level drop of the output current. The unevenness of the current capacity shown by the broken line in FIG. 9 can be expressed by the following equation:

$$I_N = I_o - \Delta I \cdot N \qquad (2)$$

wherein $I_o$ is constant, N is the order of the transistor counted from the left side of the transistor-array, and $\Delta I$ is change in current capacity between the adjacent transistors.

The transistor $F_{T1}$ has the current capacity of $I_1$ provided by:

$$I_1 = I_o - \Delta I \qquad (3)$$

and the transistor $F_{T15}$ has the capacity of $I_{15}$ provided by:

$$I_{15} = I_o - 15\Delta I \qquad (4)$$

In the DAC controlled by the 4-bit serial signal, the point where the current level drop is mos& likely to occur is that of transition from the values '0111' to '1000' of the signal. The condition by which the level drop can be avoided is defined by:

$$\sum_{N=1}^{7} (I_o - \Delta I \cdot N) < \sum_{N=8}^{15} (I_o - \Delta I \cdot N) \qquad (5)$$

which can be simplified to:

$$\Delta I < I_o/64 \qquad (6)$$

Accordingly, the change $\Delta I$ in the current capacity between the adjacent transistors must be suppressed to less than about 1.5% ($=1/64 \times 100$) of the current capacity of the adjacent transistor. The more the bit number of DAC, the less change $\Delta I$ must be. Unfortunately, the unevenness of the current capacity of the transistors exceeding the above value $\Delta I$ is inevitably induced through the manufacturing process no matter how precisely the process control is carried out.

Figure 10:
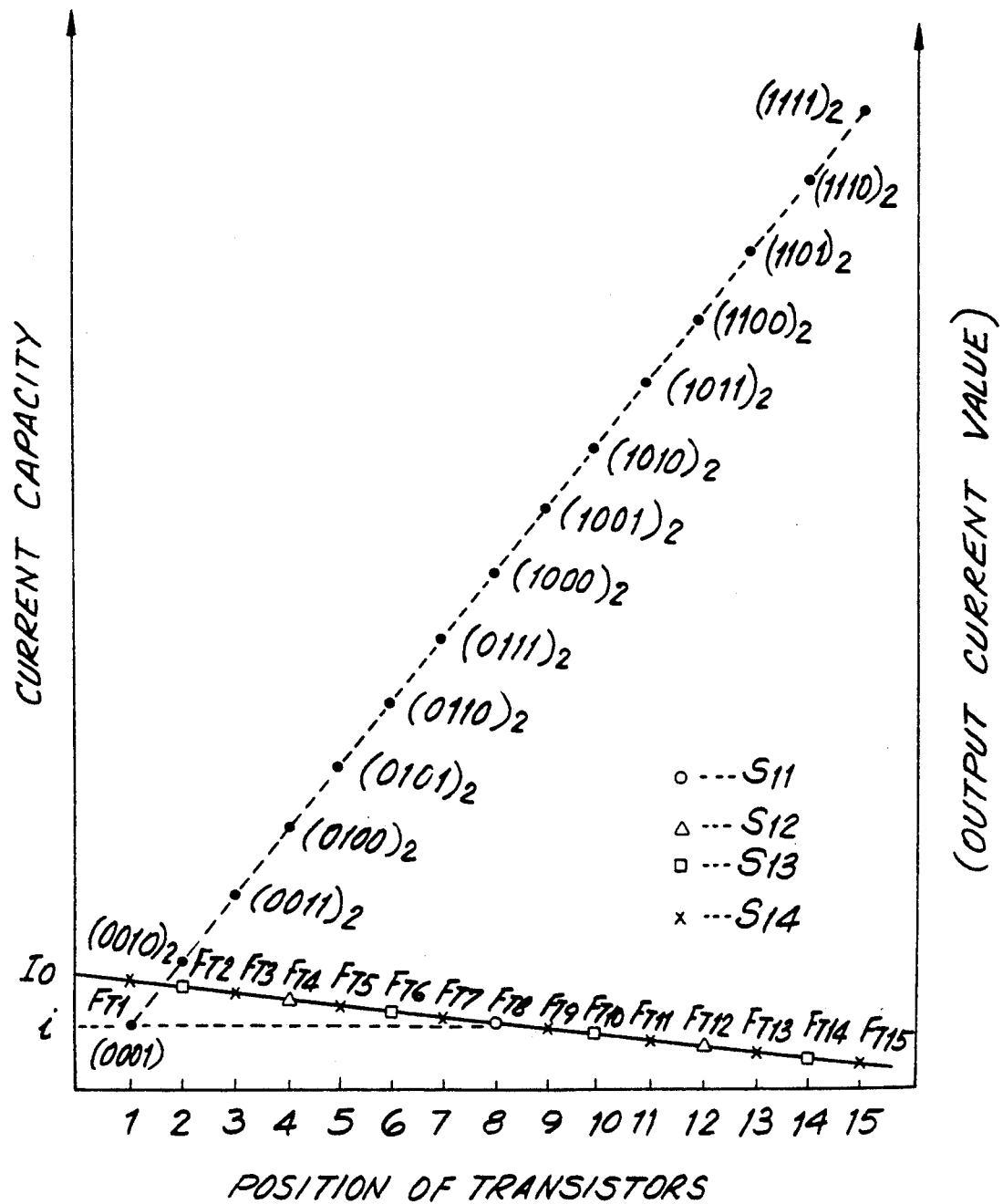
FIG. 10 illustrates linear characteristics of variation in current capacity of the switching transistors, together with linear characteristics of output current with respect to digital input signal in the digital-to-analog converter according to a preferred embodiment of the invention.

As mentioned above with reference to FIG. 7, in the present embodiment, the transistor-array is arranged such that the transistor $F_{T8}$ having the gate input of the first bit $S_{11}$ of the serial signal is positioned in the center of the array and the transistors having the gate input of the same bit of the serial signal are positioned symmetrically with respect to the middle transistor $F_{T8}$. In this arrangement of the transistors, the output current value varies along the broken line shown in FIG. 10, wherein the middle transistor $F_{T8}$ has the current capacity i and the output current value increases monotonically in response to the monotonic increase in the value of the gate signal. The transistors $F_{T4}$ and $F_{T12}$ connected to the second gate signal $S_{12}$ generate the current output 2i, and the transistors $F_{T1}$, $F_{T15}$, $F_{T3}$, $F_{T13}$, $F_{T5}$, $F_{T11}$, $F_{T7}$ and $F_{T9}$ connected to the third gate signal $S_{13}$ generate the current output 8i. That is, since the pair of transistors connected to the same gate signal are positioned symmetrically with respect to the middle transistors $F_{T8}$ having an average current capacity of the transistor-array, one of the pair transistors has the current capacity exceeding the average capacity by $+N\cdot\Delta i$, while the other one has the current capacity below the average capacity by $-N\cdot\Delta i$. Thus, the total amount of the capacity of the pair of the transistors is 2i. According to the present embodiment, the unevenness in the current capacity which occurs in the process of manufacturing transistors can be avoided or suppressed to the extent that the linearity or monotonity of change in the output current with respect to the input signal is maintained.

Figure 11:
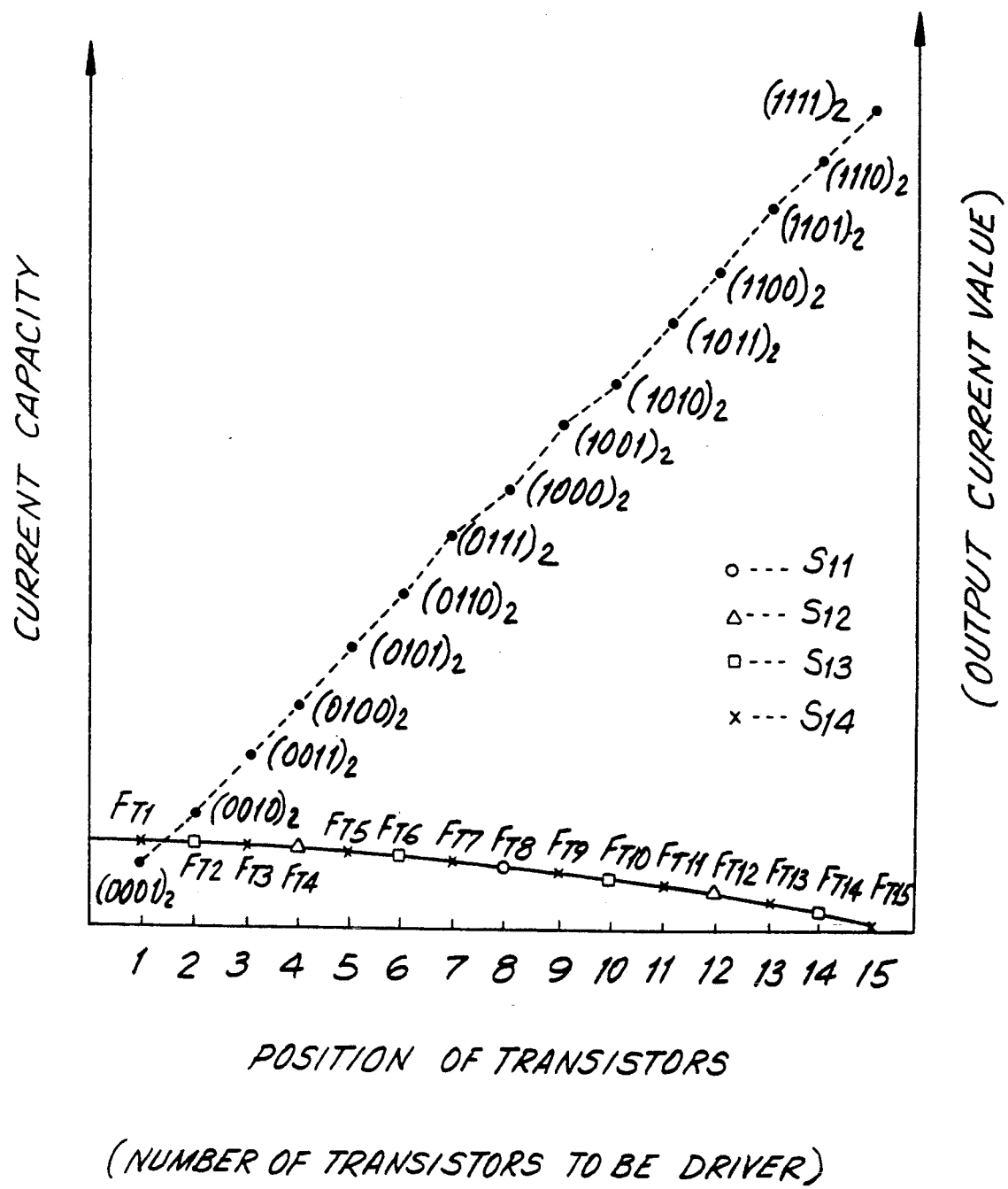
FIG. 11 illustrates monotonic characteristics of variation in current capacity of the switching transistors, together with monotonic characteristics of output current with respect to digital input signal in the digital-to-analog converter (DAC) according to a preferred embodiment of the invention.

The above argument is based on the assumption that the unevenness in the current capacity of the transistors exhibits linear characteristics. Although this, of course, can be applied to many cases, it must be considered that the unevenness in the current capacity exhibits monotonic characteristics represented by curves of secondary degree. Among such curves, one curve has no turning points as shown by the solid line in FIG. 11. In this case, the above arrangement of transistors can also be applied to maintain the monotonity of the increase in the current output as shown by the broken line, although the linear characteristics of the current output is somewhat deteriorated.

Figure 12:
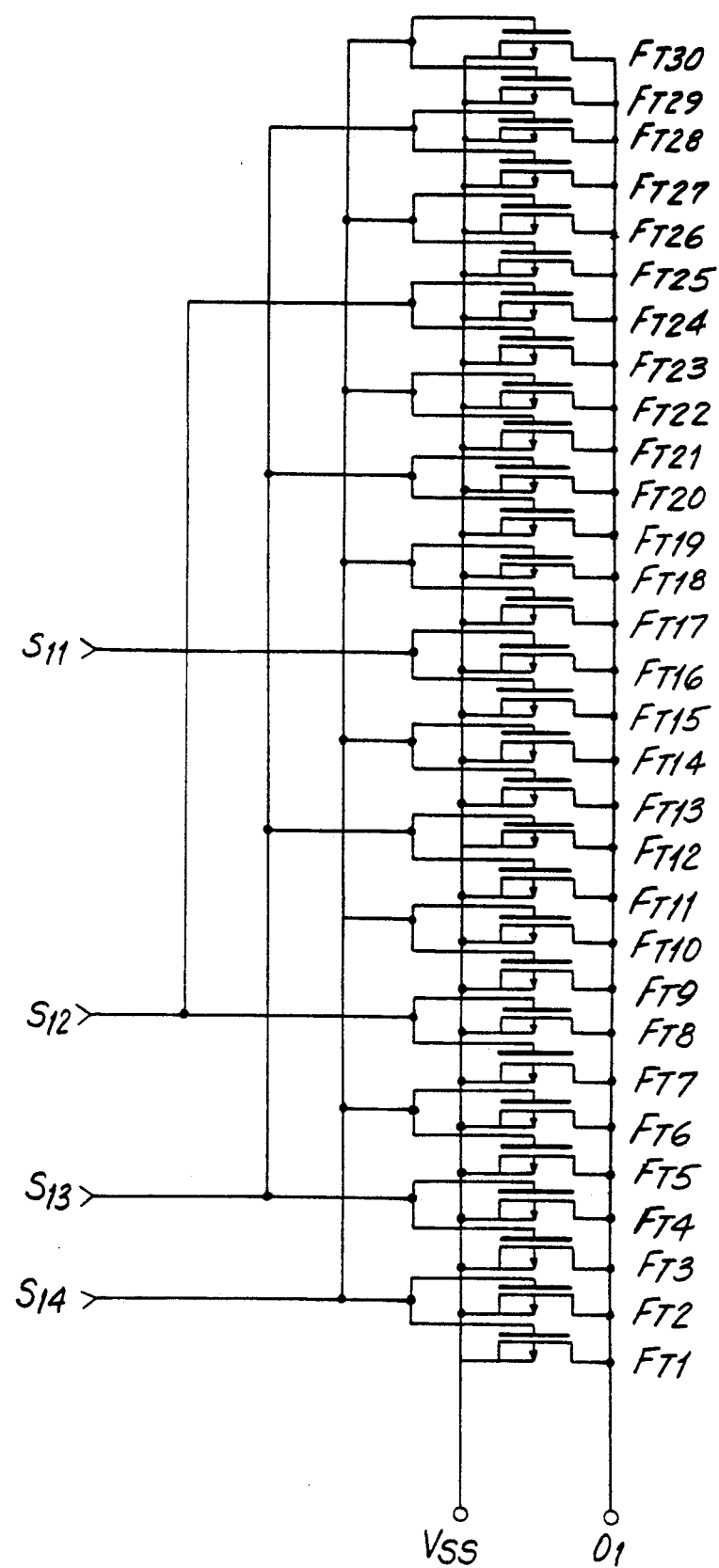
FIG. 12 illustrates another embodiment of the DAC according to the invention.
Figure 13:
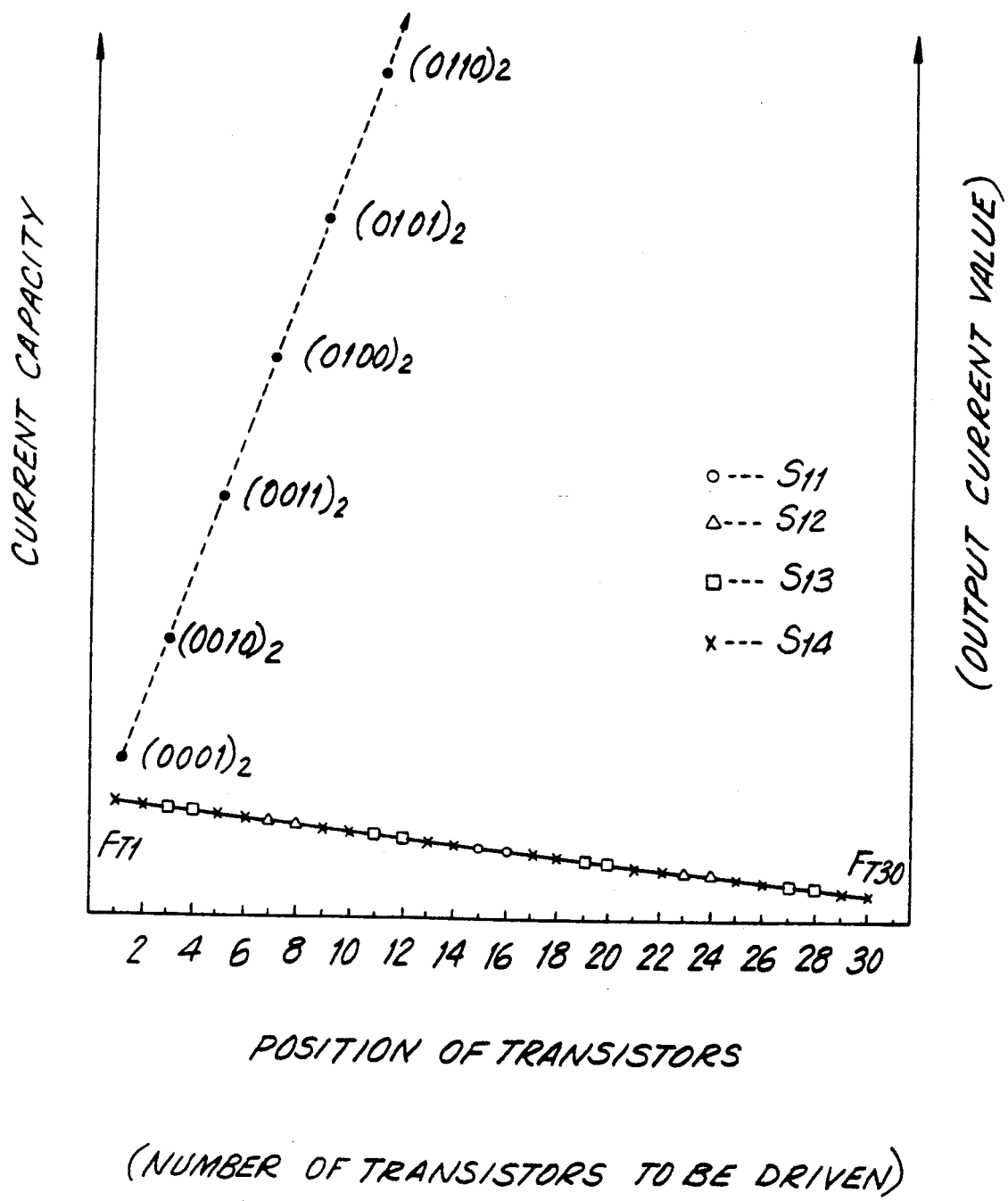
FIG. 13 illustrates linear characteristics of variation in current capacity of the switching transistors, together with linear characteristics of output current with respect to digital input signal in the DAC of FIG. 12.

FIG. 12 illustrates another example of the transistor arrangement, wherein thirty field-effect transistors $F_{T1}$ to $F_{T30}$ forming the DAC are of the same shape and size, and are arranged at the same intervals to form a transistor-array. In this array, each pair of adjacent transistors are connected at their gates with each other, that is, ($F_{T1}$, $F_{T2}$), ($F_{T3}$, $F_{T4}$), ($F_{T5}$, $F_{T6}$), ($F_{T7}$, $F_{T8}$), ($F_{T9}$, $F_{T10}$), ($F_{T11}$, $F_{T12}$), ($F_{T13}$, $F_{T14}$), ($F_{T15}$, $F_{T16}$), ($F_{T17}$, $F_{T18}$), ($F_{T19}$, $F_{T20}$), ($F_{T21}$, $F_{T22}$), ($F_{T23}$, $F_{T24}$), ($F_{T25}$, $F_{T26}$), ($F_{T27}$, $F_{T28}$) and ($F_{T29}$, $F_{T30}$) are connected with each other. Each pair of the transistors functions as a unit switching element. The pair of transistors ($F_{T15}$, $F_{T16}$) is located in the center of the array and is supplied with the gate signal $S_{11}$. With respect to this pair, pairs of transistors which are supplied with the same gate signals are located symmetrically in the array. ($F_{T13}$, $F_{T14}$) and ($F_{T17}$, $F_{T18}$) are connected in the signal $S_{14}$, ($F_{T11}$, $F_{T12}$), ($F_{T19}$, $F_{T20}$) to the signal $S_{13}$, ($F_{T9}$, $F_{T10}$) and ($F_{T21}$, $F_{T22}$) to the signal $S_{14}$, ($F_{T7}$, $F_{T8}$) and ($F_{T23}$, $F_{T24}$) to the signal $S_{12}$, ($F_{T5}$, $F_{T6}$) and ($F_{T25}$, $F_{T26}$) to the signal $S_{14}$, ($F_{T3}$, $F_4$) and ($F_{T27}$, $F_{T28}$) to the signal $S_{13}$, and ($F_{T1}$, $F_{T2}$) and ($F_{T29}$, $F_{T30}$) to the signal $S_{14}$. The DAC in which the unit transistor portion includes two or more transistors positioned adjacent to each other functions substantially the same as that shown in FIG. 4. One advantage of the arrangement is that a DAC having a larger number of transistors may be deposited in a limited space such as where the output pad pitch is narrow, without decreasing the width of the channels of the transistors. The DAC provided with the transistor arrangement shown in FIG. 12 shows linear characteristics of output current as shown by the solid line in FIG. 13.

Figure 14:
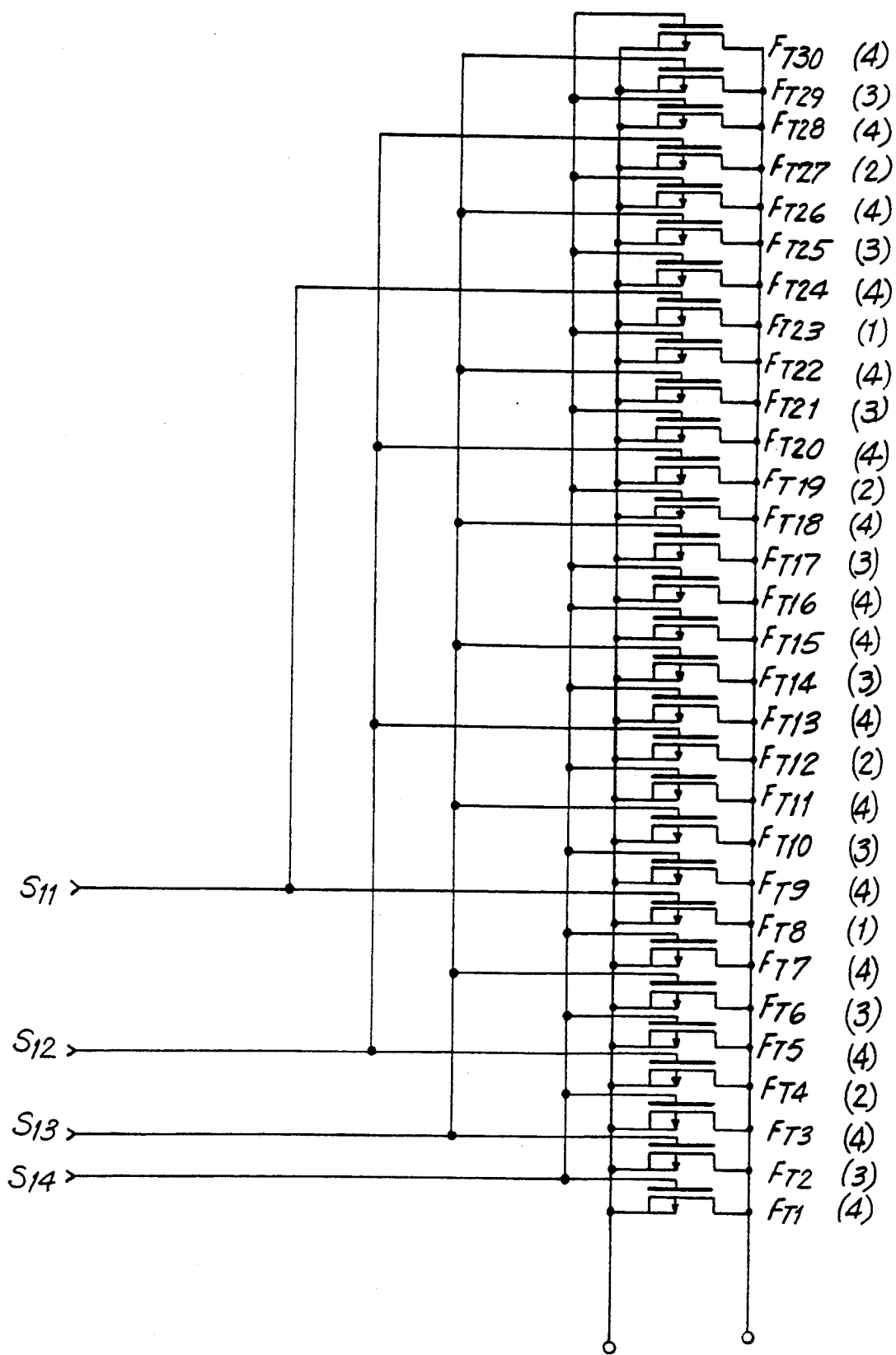
FIG. 14 illustrates still another embodiment of the DAC according to the invention.

FIG. 14 shows another relationship of connection between the field-effect transistors and the gate signals, wherein thirty transistors $F_{T1}$ to $F_{T30}$ are of the same shape and size and are arranged in the same direction at the same intervals to form a transistor-array. As shown in FIG. 14 wherein the bit numbers of the 4-bit serial digital signal are denoted in the parentheses, the transistors $F_{T1}$ to $F_{T30}$ are connected to the gate signals $S_{11}$ to $S_{14}$ as follows:

| | | | |
|---|---|---|---|
| $F_{T15}$ | $F_{T16}$ | .... | $S_{14}$ |
| $F_{T14}$ | $F_{T17}$ | .... | $S_{13}$ |
| $F_{T13}$ | $F_{T18}$ | .... | $S_{14}$ |
| $F_{T12}$ | $F_{T19}$ | .... | $S_{12}$ |
| $F_{T11}$ | $F_{T20}$ | .... | $S_{14}$ |
| $F_{T10}$ | $F_{T21}$ | .... | $S_{13}$ |
| $F_{T9}$ | $F_{T22}$ | .... | $S_{14}$ |
| $F_{T8}$ | $F_{T23}$ | .... | $S_{11}$ |
| $F_{T7}$ | $F_{T24}$ | .... | $S_{14}$ |
| $F_{T6}$ | $F_{T25}$ | .... | $S_{13}$ |
| $F_{T5}$ | $F_{T26}$ | .... | $S_{14}$ |
| $F_{T4}$ | $F_{T27}$ | .... | $S_{12}$ |
| $F_{T3}$ | $F_{T28}$ | .... | $S_{14}$ |
| $F_{T2}$ | $F_{T29}$ | .... | $S_{13}$ |
| $F_{T1}$ | $F_{T30}$ | .... | $S_{14}$ |

In this transistor-array, each pair of transistors functions as a unit switching element, such as in the transistor-array shown in FIG. 12. However, the two transistors forming each one of the unit switching elements are not positioned adjacent to each other except for the transistors $F_{T15}$ and $F_{T16}$ forming the unit switching element located in the center of the array. Each of the above pairs forms each of the unit switching elements and two transistors of each pair are positioned symmetrically with respect to the center of gravity of the middle unit switching element including transistors $F_{T15}$ and $F_{T16}$. As to the words "center of gravity", since the transistors are of the same shape and size and are arranged in the same intervals in this embodiment, the center of gravity of the middle transistors corresponds to the center of the transistors or the center of the array.

Figure 15:
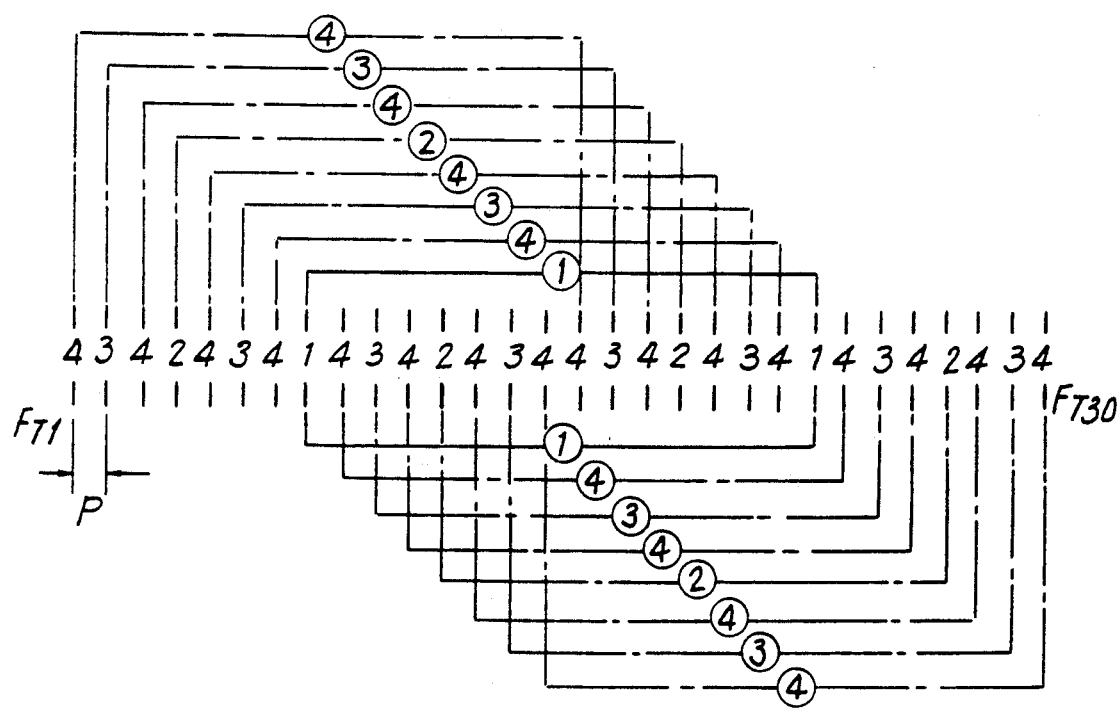
FIG. 15 is a schematic view showing a pattern of the transistor-array of FIG. 14.

With reference to FIG. 15, the positions of the transistors $F_{T1}$ to $F_{T30}$ are denoted by the bit numbers 1 to 4 of the gate signal. The transistors $F_{T8}$ and $F_{T23}$ supplied with the first bit of the gate signal or $S_{11}$ are positioned apart from each other by 15 p and have a center of gravity which is located at the center of the array. The transistors which have a center of gravity displaced by 1 p in the right direction in FIG. 15 next to the center of gravity of the transistors $F_{T8}$ and $F_{T23}$ are $F_{T9}$ and $F_{T24}$, both of which are supplied with the fourth bit of the gate signal or $S_{14}$. Likewise, by picking up a pair of transistors one by one in either right or left direction next to the transistors $F_{T8}$ and $F_{T23}$, and then writing down the bit number of the gate signal supplied to the picked pair of transistors, the bit number pattern becomes as follows:

$$4 \to 3 \to 4 \to 2 \to 4 \to 3 \to 4 \to 1 \to 4 \to 3 \to 4 \to 2 \to 4 \to 3 \to 4$$

Figure 16:
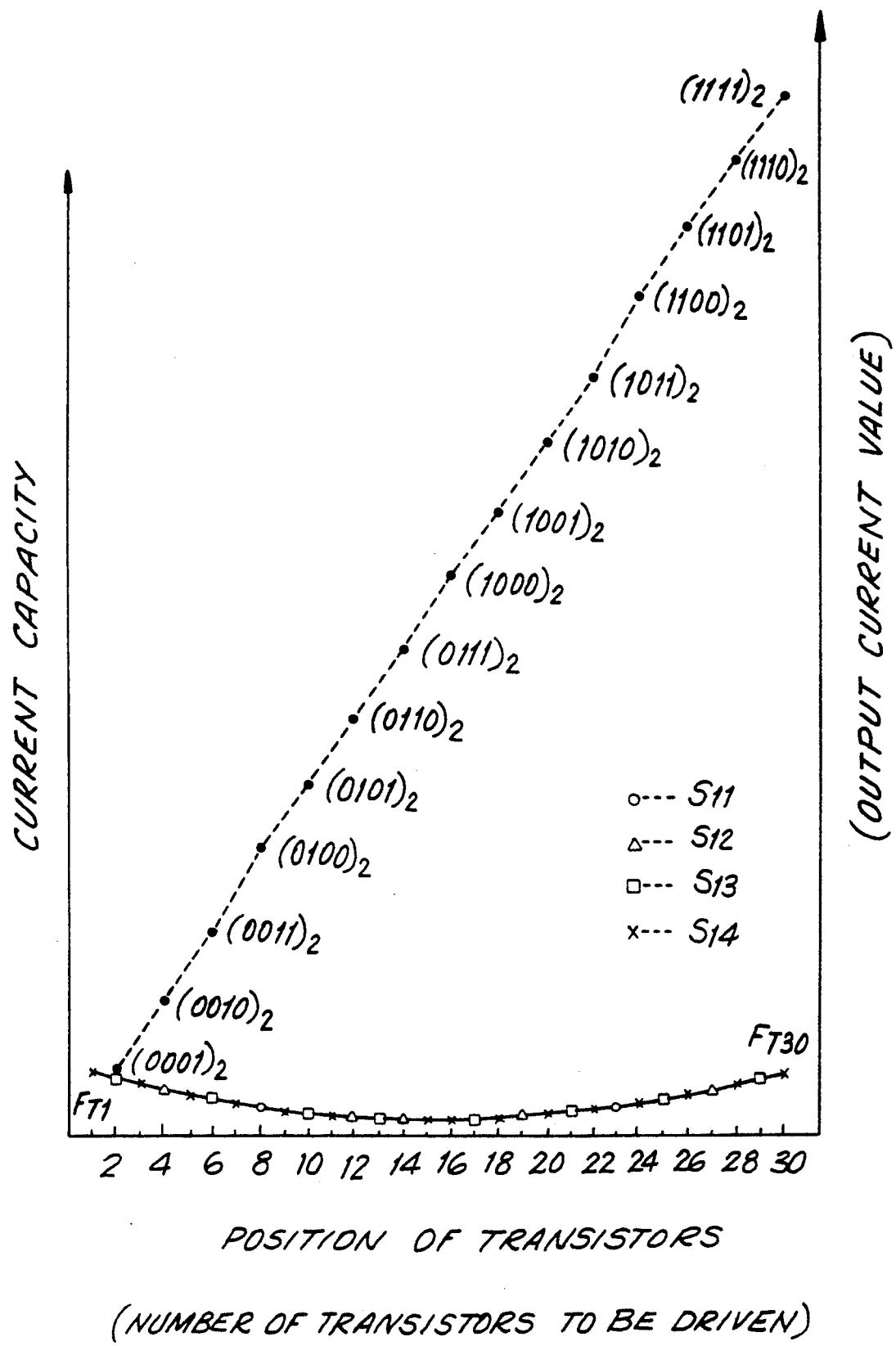
FIG. 16 illustrates characteristics of variation in current capacity of the switching transistors whose curve exhibits a turning point at a position around the center of the transistor-array, together with monotonic characteristics of output current with respect to digital input signal in the DAC of FIG. 14.
Figure 17:
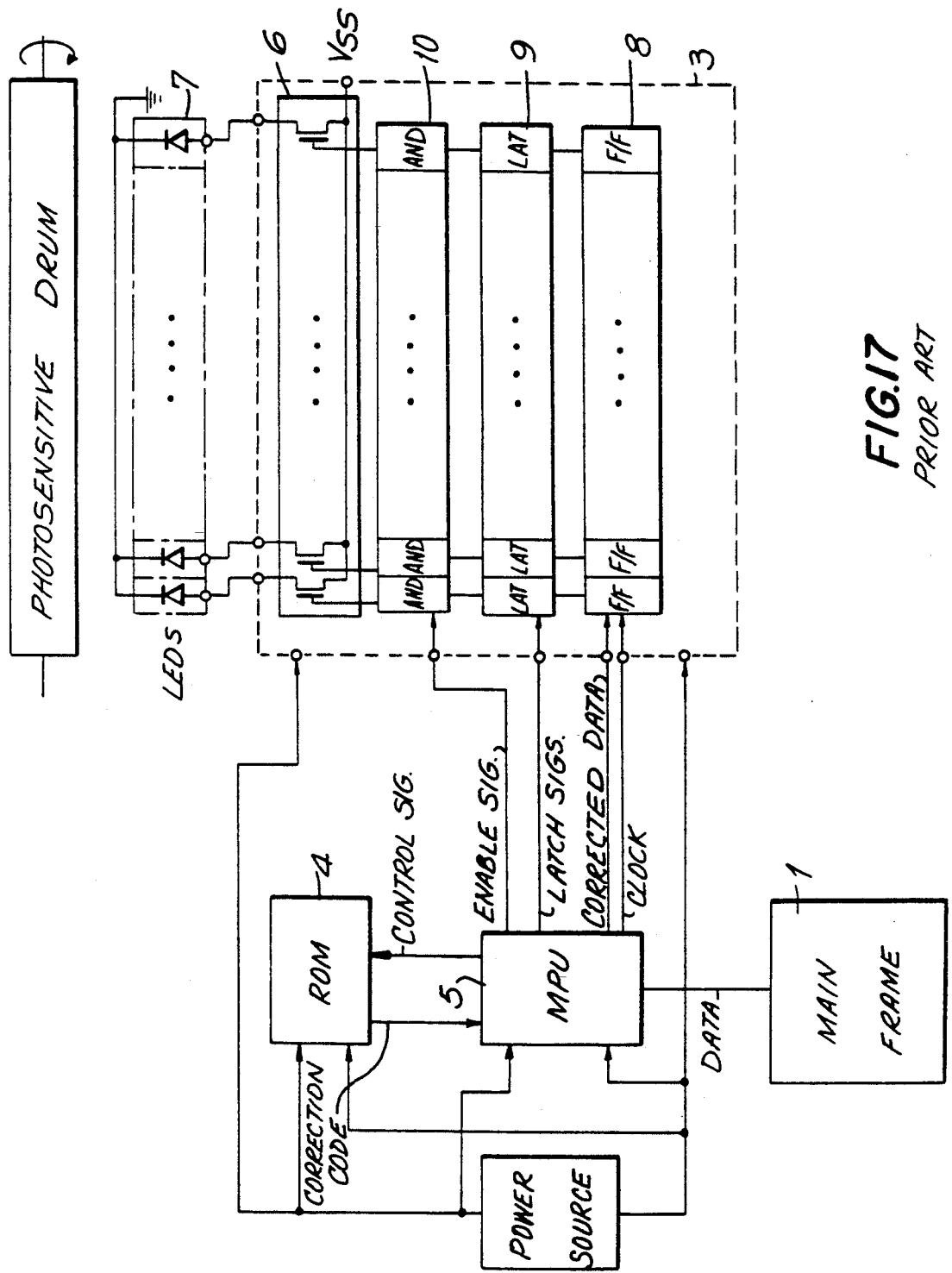
FIG. 17 is a block diagram of a conventional drive circuit for an LED printer.
Figure 18:
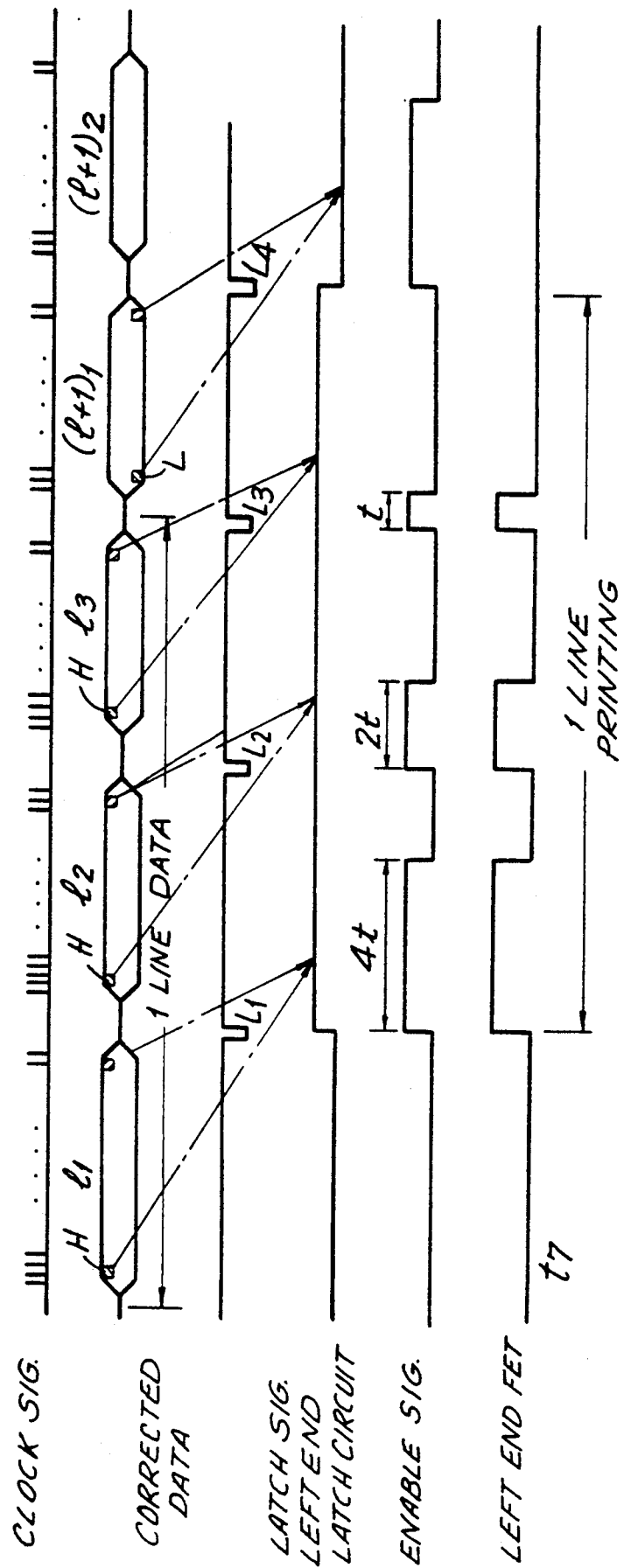
FIG. 18 is a signal time chart showing the operation of the drive circuit of FIG. 17.

This order is the same as that of the embodiment shown in FIG. 4. The arrangement of the present embodiment is effective and advantageous to assure the monotonic characteristic of the output current where the current capacity of the transistor-array exhibits unevenness along curves of secondary degree having a turning point. An example is shown in FIG. 16, wherein the transistors of the array show unevenness in the current capacity shown by the solid line having a turning point at the middle of the array. In this case, since the transistors $F_{T5}$ and $F_{T23}$ are positioned apart from each other by as far as 15 p, the total current capacity of these transistors is approximately twice as much as an average current capacity among the thirty transistors $F_{T1}$ to $F_{T30}$. This is also true for each pair of transistors which are apart by 15 p. According to the present embodiment, the monotonic characteristics of the output current can be obtained even where the current capacity of the transistors varies along a curve having a turning point. In the above embodiment, the unit switching element may include three or more transistors which are positioned such that the center of gravity of these transistors is situated at the center of the array, by which monotonic characteristics of the output current can be obtained where the unevenness in the current capacity of the transistors shows a variety of characteristic curves, and so the yields of this type of integrated circuit can be furthermore improved.

It will thus be seen that the objects set forth above, among those made apparent f rom the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A current supplying integrated circuit having multi-output for controlling current supply from a current source to a plurality of elements to be driven, comprising a plurality of switching means for controllably supplying the current from said source to the corresponding element to be driven, each of said switching means comprising N unit switching elements arranged to be connected in parallel to each other to form a current synthesizing circuit, each of said unit switch elements being switchable from a first condition wherein no current flows therethrough to a second condition wherein a predetermined essentially constant current flows therethrough, each of said unit switching elements including at least one field effect transistor for providing essentially constant current, said at least one field effect transistor operating in the saturation region of the characteristic curve when in the second condition, said switching means supplying an essentially constant current to the associated element to be driven equal to at least the sum of the predetermined essential constant currents flowing through those of the unit switching elements thereof in said second condition.

2. The current supplying integrated circuit of claim 1, wherein said N unit switching elements are divided into n groups so that the number of said unit switching elements belonging to the i-th group is $2^{i-1}$ wherein $n < N$, $1 \leq i \leq n$, and $$\sum_{i=1}^{n} 2^{i-1} = 2^n - 1 = N$$

and wherein each group of unit switching elements is controlled by a corresponding bit of an n-bit digital control signal.

3. The current supplying integrated circuit of claim 2, wherein each group of unit switching elements includes at least two unit switching elements spaced along the length of the parallel connection and having a center of gravity defined by a unit switching element, the centers of gravity of adjacent groups of unit switching elements having adjacent centers of gravity, two groups of unit switching elements being deemed adjacent when the unit switching element on one end of each of the two groups as viewed along the length of the parallel connection are adjacent.

4. The current supplying integrated circuit of claim 2, wherein each of said unit switching elements comprises either a single field-effect transistor or a plurality of field-effect transistors positioned adjacent to each other and connected in parallel to each other.

5. The current supplying integrated circuit of claim 4, wherein said N unit switching elements are of substantially the same shape and size and are arranged on a semiconductor substrate in one direction at equal intervals to form a switching-element array.

6. The current supplying integrated circuit of claim 2, wherein the switching elements which belong to each group are arranged in symmetrical order on each side of a switching element of the first group.

7. The current supplying integrated circuit of claim 2, wherein the switching element belonging to the first group of said n groups is located in the center of the switching-element array and the switching elements belonging to the other groups are arranged from the switching element of the first group to both ends of the switching-element array in the following order symmetrical to the switching element of the first group:

when $n=2$, then $n \to 1 \to n$;
when $n=3$, then $n \to (n-1) \to n \to 1 \to n \to (n-1) \to n$;
when $n=4$, then $n \to (n-2) \to n \to (n-1) \to n \to 1 \to n \to (n-1) \to n \to (n-2) \to n$;
when $n=5$, then $n \to (n-3) \to n \to (n-2) \to n \to (n-1) \to n \to 1 \to n \to (n-1) \to n \to (n-2) \to n \to (n-3) \to n$; and
when $n=6$ or greater, then $n \to (n-1) \to n \to (n-2) \to n \to (n-) \to \ldots n \to 2 \to n \to \ldots \to n \to (n-2) \to n \to (n-1) \to n$.

8. The current supplying integrated circuit of claim 7, wherein each of said switching means has at least one offsetting field-effect transistor connected in parallel to said current synthesizing circuit.

9. The current supplying integrated circuit of claim 2, wherein each of said unit switching elements comprises at least two field-effect transistors connected in parallel to each other and wherein the field-effect transistors belonging to the different groups are arranged adjacent to each other.

10. The current supplying integrated circuit of claim 9, wherein said N unit switching elements are of substantially the same shape and size and are arranged on a semiconductor substrate in one direction at equal intervals to form a switching-element array.

11. The current supplying integrated circuit of claim 2, wherein at least two field-effect transistors belonging to the first group have their center of gravity positioned in the center of the switching-element array, and wherein the respective groups have at least two transistors, the centers of gravity of which appear in the direction from said center of gravity of the first group to both ends of the switching-element array in the following order wherein said centers of gravity of the transistors are expressed by the groups number 1 to n to which the transistors belong:

when $n=2$, then $n \to 1 \to n$;
when $n=3$, then $n \to (n-1) \to n \to 1 \to n \to (n-1) \to n$;
when $n=4$, then $n \to (n-2) \to n \to (n-1) \to n \to 1 \to n \to (n-1) \to n \to (n-2) \to n$;
when $n=5$, then $n \to (n-3) \to n \to (n-2) \to n \to (n-1) \to n \to 1 \to n \to (n-1) \to n \to (n-2) \to n \to (n-3) \to n$; and
when $n=6$ or greater, then $n \to (n-1) \to n \to (n-2) \to n \to (n-) \to \ldots n \to 2 \to n \to \ldots \to n \to (n-2) \to n \to (n-1) \to n$.

12. The current supplying integrated circuit of claim 11, wherein each of said switching means has at least one offsetting field-effect transistor connected in parallel to said current synthesizing circuit.

13. The current supplying integrated circuit of claim 1, wherein each of said unit switching elements comprises either a single field-effect transistor or a plurality of field-effect transistors positioned adjacent to each other and connected in parallel to each other.

14. The current supplying integrated circuit of claim 13, wherein said N unit switching elements are of substantially the same shape and size and are arranged on a semiconductor substrate in one direction at equal intervals to form a switching-element array.

15. The current supplying integrated circuit of claim 2, wherein said N unit switching elements are of substantially the same shape and size and are arranged on a semiconductor substrate in one direction at equal intervals to form a switching-element array.

16. The current supplying integrated circuit of claim 1, wherein each of said unit switching elements comprises at least two field-effect transistors connected in parallel to each other, and wherein the field-effect transistors belonging to the different groups are arranged adjacent to each other.

17. The current supplying integrated circuit of claim 16, wherein said N unit switching elements are of substantially the same shape and size and are arranged on a semiconductor substrate in one direction at equal intervals to form a switching-element array.

18. The current supplying integrated circuit of claim 17, wherein each of said switching means has at least one offsetting field-effect transistor connected in parallel to said current synthesizing circuit.

19. The current supplying integrated circuit of claim 1, wherein each of said switching means has at least one offsetting field-effect transistor connected in parallel to said current synthesizing circuit, said at least one offsetting field effect transistor selectively permitting a predetermined essentially constant current to flow therethrough for addition to the current flowing through said unit switching elements.

20. An electronic device for controlling a plurality of elements which are controlled in their driving state by the level of electric current from a current source applied thereto, comprising a current supplying means controlled by an output data and a corrected data, said output data being relative to whether said corresponding element is driven, said corrected data being relative to said level of electric current applied, said current supplying means producing said current in response to said corrected data, said current supplying means comprising a plurality of switching means for respectively controlling the supply of said current to a corresponding element to be driven in response to said corrected data, each of said switching means comprising N unit switching elements arranged to be connected in parallel to each other to form a current synthesizing circuit, each of said switching elements being switchable from a first condition wherein no current flows therethrough to a second condition wherein a predetermined essentially constant current flows therethrough, each of said unit switching elements including at least one field effect transistor for providing essentially constant current, said at least one field effect transistor operating in the saturation region of the characteristic curve when in the second condition, said switching means supplying an essentially constant current to the associated element to be driven equal to at least the sum of the predetermined essentially constant currents flowing through those of the unit switching elements thereof in said second condition.

21. The electronic device of claim 20, wherein said N unit switching elements are divided into n groups so that the number of said unit switching elements belonging to the i-th group is set to be $2^{i-1}$ wherein $n<N$, $1 \leq i \leq n$, and $$\sum_{i=1}^{n} 2^{i-1} = 2^n - 1 = N$$

and each of said corrected data signals is an n-bit digital signal and each group of unit switching elements is controlled by a corresponding bit of said n-bit digital signal.

22. The electronic device of claim 21, wherein each group of unit switching elements includes at least two unit switching elements spaced along the length of the parallel connection and having a center of gravity defined by a unit switching element, the centers of gravity of adjacent groups of unit switching elements having adjacent centers of gravity, two groups of unit switching elements being deemed adjacent when the unit switching element on one end of each of the two groups as viewed along the length of the parallel connection are adjacent.

23. The electronic device of claim 21, wherein each of said unit switching elements comprises a single field-effect transistor or a plurality of field-effect transistors positioned adjacent to each other and connected in parallel to each other, said field-effect transistors being of substantially the same shape and size and being arranged on a semiconductor substrate in one direction at the same intervals to form a switching-element array.

24. The electronic device of claim 23, wherein said field-effect transistors belonging to the first group of said n group are located in the center of the switching-element array and the field-effect transistors belonging to the other groups are arranged in the direction from the field-effect transistors of the first group to both ends of the array in the following order symmetrical to the transistors of the first group:

when $n=2$, then n→1→n;
when $n=3$, then n→(n−1)→n→1→n→(n−1)→n;
when $n=4$, then n→(n−2)→n→(n−1)→n→1→n→(n−1)→n→(n−2)→n;
when $n=5$, then n→(n−3)→n→(n−2)→n→(n−1)→n→1→n→(n−1)→n→(n−2)→n→(n−3)→n; and
when $n=6$ or greater, then n→(n−1)→n→(n−2)→n→(n−)→ ... n→2→n→ . . . →n→(n−2)→n→(n−1)→n.

25. The electronic device of claim 20, wherein each of said switching means has at least one offsetting field-effect transistor connected in parallel to said current synthesizing circuit, said at least one offsetting field effect transistor selectively permitting a predetermined essentially constant current to flow therethrough for addition to the current flowing through said unit switching elements.

26. The electronic device of claim 21, wherein each of said unit switching elements comprises at least two field-effect transistors located symmetrically and connected in parallel to each other and wherein the field-effect transistors belonging to the different groups are arranged adjacent to each other, said field-effect transistors being of substantially the same shape and size and being arranged on a semiconductor substrate in one direction at the same intervals to form a switching-element array.

27. The electronic device of claim 26, wherein at least two transistors belonging to the first group have their center of gravity positioned in the center of the switching-element array and the respective groups have at least two transistors, the centers of gravity of which appear in the direction from said center of gravity of the first group to both ends of the switching-element array in the following order wherein said centers of gravity of the transistors are expressed by the group numbers 1 to n to which the transistors belong:

when $n=2$, then n→1→n;
when $n=3$, then n→(n−1)→n→1→n→(n−1)→n;
when $n=4$, then n→(n−2)→n→(n−1)→n→1→n→(n−1)→n→(n−2)→n;
when $n=5$, then n→(n−3)→n→(n−2)→n→(n−1)→n→1→n→(n−1)→n→(n−2)→n→(n−3)→n; and
when $n=6$ or greater, then n→(n−1)→n→(n−2)→n→(n−)→ ... n→2→n→ . . . →n→(n−2)→n→(n−1)→n.

28. The electronic device of claim 22, wherein each of said switching means has at least one offsetting field-effect transistor connected in parallel to said current synthesizing circuit, said at least one offsetting field effect transistor selectively permitting a predetermined essentially constant current to flow therethrough for addition to the current flowing through said unit switching elements.

29. An electronic device for controlling a plurality of elements which are essentially aligned in a first direction and are controlled in their driving state by the level of electronic current applied thereto, comprising a current supplying means controlled by an output data and a corrected data, said output data being relative to whether said corresponding element is driven, said correcting data being relative to said level of electric current applied, said current supplying means producing said current in response to said corrected data, said current supplying means comprising a plurality of switching means for respectively supplying said current to a corresponding element to be driven, each of said switching means comprising N unit switching elements arranged to be connected in parallel to each other to form a current synthesizing circuit, said switching elements being essentially aligned in a second direction, said second direction being substantially orthogonal to said first direction.

30. The electronic device of claim 29, wherein said N unit switching elements are divided into n groups so that the number of said unit switching elements belonging to the i-th group is set to be $2^{1-i}$ wherein $n<N$, $1 \leq i \leq n$, and $$\sum_{i=1}^{n} 2^{i-1} = 2^n - 1 = N$$

and each of said corrected data signals is an n-bit digital signal and each group of unit switching elements is controlled by a corresponding bit of said n-bit digital signal.

31. The electronic device of claim 30, wherein each group of unit switching elements includes at least two unit switching elements spaced along the length of the parallel connection and having a center of gravity defined by a unit switching element, the centers of gravity of adjacent groups of unit switching elements having adjacent centers of gravity, two groups of unit switching elements being deemed adjacent when the unit switching element on one end of each of the two groups as viewed along the length of the parallel connection are adjacent.

32. The electronic device of claim 30, wherein each of said unit switching elements comprises a single field-effect transistor or a plurality of field-effect transistors positioned adjacent to each other and connected in parallel to each other, said field-effect transistors being of substantially the same shape and size and being arranged on a semiconductor substrate in one direction at the same intervals to form a switching-element array.

33. The electronic device of claim 32, wherein said field-effect transistors belonging to the first group of said n group are located in the center of the switching-element array and the field-effect transistors belonging to the other groups are arranged in the direction from the field-effect transistors of the first group to both ends of the array in the following order symmetrical to the transistors of the first group:

when n=2, then n→1→n;
when n=3, then n→(n−1)→n→1→n→(n−1)→n;
when n=4, then n→(n−2)→n→(n−1)→n→1→n→(n−1)→n→(n−2)→n;
when n=5, then n→(n−3)→n→(n−2)→n→(n−1)→n→1→n→(n−1)→n→(n−2)→n→(n−3)→n; and
when n=6 or greater, then n→(n−1)→n→(n−2)→n→(n−)→ ... n→2→n→ ... →n→(n−2)→n→(n−1)→n.

34. The electronic device of claim 29, wherein each of said switching means has at least one offsetting field effect transistor connected in parallel to said current synthesizing circuit, said at least one offsetting field effect transistor selectively permitting a predetermined essentially constant current to flow therethrough for addition to the current flowing through said unit switching elements.

35. The electronic device of claim 32, wherein said elements to be driven are LEDs.

36. The electronic device of claim 30, wherein each of said unit switching elements comprises at least two field-effect transistors located symmetrically and connected in parallel to each other and wherein the field-effect transistors belonging to the different groups are arranged adjacent to each other, said field-effect transistors being of substantially the same shape and size and being arranged on a semiconductor substrate in one direction at the same intervals to form a switching-element array.

37. The electronic device of claim 36, wherein at least two transistors belonging to the first group have their center of gravity positioned in the center of the switching-element array and the respective groups have at least two transistors, the centers of gravity of which appear in the direction from said center of gravity of the first group to both ends of the switching-element array in the following order wherein said centers of gravity of the transistors are expressed by the group numbers 1 to n to which the transistors belong:

when n=2, then n→1→n;
when n=3, then n→(n−1)→n→1→n→(n−1)→n;
when n=4, then n→(n−2)→n→(n−1)→n→1→n→(n−1)→n→(n−2)→n;
when n=5, then n→(n−3)→n→(n−2)→n→(n−1)→n→1→n→(n−1)→n→(n−2)→n→(n−3)→n; and
when n=6 or greater, then n→(n−1)→n→(n−2)→n→(n−)→ ... n→2→n→ ... →n→(n−2)→n→(n−1)→n.

38. The electronic device of claim 31, wherein each of said switching means has at least one offsetting field-effect transistor connected in parallel to said current synthesizing circuit, said at least one offsetting field effect transistor selectively permitting a predetermined essentially constant current to flow therethrough for addition to the current flowing through said unit switching elements.

39. The electronic device of claim 37, wherein said elements to be driven are LEDS.

40. The electronic device of claim 29, and including means for storing said correction data signals associated with each of said elements.

41. The electronic device of claim 40, wherein said correction data storing means includes a plurality of flip-flops.

42. The electronic device of claim 40, wherein said means for receiving said data signals and said correction data includes an output transistor control circuit associated with each of said elements, said control circuit including a print mode decision circuit for receiving said data signals to determine if the associated element is to be driven, and level shifting circuit means for setting the level of electric current in response to said stored correction data.

43. The electronic device of claim 42, wherein said level shifting circuit means includes means for selecting an offset current and means for selecting from a plurality of incremental currents for addition to said offset current in response to said correction data to produce the desired of the multi-levels of current to drive the elements.

44. The current supplying integrated circuit of claim 1, wherein said plurality of elements to be driven are essentially aligned in a first direction and said N unit switching elements are essentially aligned in a second direction, said first direction being substantially orthogonal to said second direction.

45. The current supplying integrated circuit of claim 1, wherein each of said N unit switching elements in a switching means are adapted to permit essentially the same essentially constant current to flow therethrough when in said second condition.

46. The electronic device of claim 20, wherein said plurality of elements to be driven are essentially aligned in a first direction and said N unit switching elements are essentially aligned in a second direction, said first direction being substantially orthogonal to said second direction.

47. The electronic device of claim 20, wherein each of said N unit switching elements in a switching means are adapted to permit essentially the same essentially constant current to flow therethrough when in said second condition.

48. The electronic device of claim 29, wherein each of said N unit switching elements in a switching means are adapted to permit essentially the same essentially constant current to flow therethrough when in said second condition.

49. The electronic device of claim 29, wherein a microprocessor unit controls and outputs the output data and corrected data.

50. An LED printer having an LED printer head for printing by using a plurality of LEDs, comprising:
   storage means for storing digital data representative of LED intensity correction;
   driving means for driving said LEDs;
   processor means for receiving said stored data and outputting said data to said driving means; and
   said driving means including digital to analog conversion means for converting said digital data into analog information for driving said LEDs, said digital to analog conversion means being adapted to synthesize a constant current flow into each of said LEDs, said constant current flow to each LED to be corrected being the sum of a plurality of selected constant currents, the selection of said constant currents for summing being determined by said digital data.

51. An LED printer having an LED printer head for printing by using a plurality of LEDs, comprising:
   storage means for storing digital data representative of LED intensity correction;
   driving means for driving said LEDs;
   processor means for receiving said stored data and outputting said data to said driving means; and
   said driving means including digital to analog conversion means for converting said digital data into analog information for driving said LEDs, said digital to analog conversion means being adapted to synthesize a constant current flow into each of said LEDs;
   said digital to analog conversion means including a plurality of switching means for controllably supplying the current from a current source to the corresponding LED to be driven, each of the switching means comprising N unit switching elements arranged to be connected in parallel to each other to form a current synthesizing circuit, each of the unit switching elements being switchable from a first condition wherein no current flows therethrough to a second condition wherein a predetermined essentially constant current flows therethrough, the switching means supplying an essentially constant current to the associated element to be driven equal to at least the sum of the predetermined essentially constant currents flowing through those of the unit switching elements thereof in the second condition.

52. The LED printer of claim 51, wherein each of the unit switching elements includes at least one field effect transistor for providing essentially constant current, the at least one field effect transistor operating in the saturation region of the characteristic curve when in the second condition.

53. The LED printer of claim 51, wherein said N unit switching elements are divided into n groups so that the number of said unit switching elements belonging to the i-th group is $2^{i-1}$ wherein $n < N$, $1 \leq i \leq n$, and $$\sum_{i=1}^{n} 2^{i-1} = 2^n - 1 = N$$

and wherein each group of unit switching elements is controlled by a corresponding bit of an n-bit digital control signal.

54. The LED printer of claim 53, wherein each group of unit switching elements includes at least two unit switching elements spaced along the length of the parallel connection and having a center of gravity defined by a unit switching element, the centers of gravity of adjacent groups of unit switching elements having adjacent centers of gravity, two groups of unit switching elements being deemed adjacent when the unit switching element on one end of each of the two groups as viewed along the length of the parallel connection are adjacent.

55. The LED printer of claim 53, wherein each of said unit switching elements comprises either a single field-effect transistor or a plurality of field-effect transistors positioned adjacent to each other and connected in parallel to each other.

56. The LED printer of claim 55, wherein said N unit switching elements are of substantially the same shape and size and are arranged on a semiconductor substrate in one direction at equal intervals to form a switching-element array.

57. The LED printer of claim 53, wherein the switching elements which belong to each group are arranged in symmetrical order on each side of a switching element of the first group.

58. The LED printer of claim 53, wherein the switching element belonging to the first group of said n groups is located in the center of the switching-element array and the switching elements belonging to the other groups are arranged from the switching element of the first group to both ends of the switching-element array in the following order symmetrical to the switching element of the first group:
   when n=2, then n→1→n;
   when n=3, then n→(n−1)→n→1→n→(n−1)→n;
   when n=4, then n→(n−2)→n→(n−1)→n→1→n→(n−1)→n→(n−2)→n;
   when n=5, then n→(n−3)→n→(n−2)→n→(n−1)→n→1→n→(n−1)→n→(n−2)→n→(n−3)→n; and
   when n=6 or greater, then n→(n−1)→n→(n−2)→n→(n−)→ . . . n→2→n→ . . . →n→(n−2)→n→(n−1)→n.

59. The LED printer of claim 58, wherein each of said switching means has at least one offsetting field-effect transistor connected in parallel to said plurality of switching means.

60. The LED printer of claim 53, wherein each of said unit switching elements comprises at least two field-effect transistors connected in parallel to each other and wherein the field-effect transistors belonging to the different groups are arranged adjacent to each other.

61. The LED printer of claim 60, wherein said N unit switching elements are of substantially the same shape and size and are arranged on a semiconductor substrate in one direction at equal intervals to form a switching-element array.

62. The LED printer of claim 53, wherein at least two field-effect transistors belonging to the first group have their center of gravity positioned in the center of the switching-element array, and wherein the respective groups have at least two transistors, the centers of gravity of which appear in the direction from said center of gravity of the first group to both ends of the switching-element array in the following order wherein said centers of gravity of the transistors are expressed by the groups number 1 to n to which the transistors belong:

when $n=2$, then $n \to 1 \to n$;
when $n=3$, then $n \to (n-1) \to n \to 1 \to n \to (n-1) \to n$;
when $n=4$, then $n \to (n-2) \to n \to (n-1) \to n \to 1 \to n \to (n-1) \to n \to (n-2) \to n$;
when $n=5$, then $n \to (n-3) \to n \to (n-2) \to n \to (n-1) \to n \to 1 \to n \to (n-1) \to n \to (n-2) \to n \to (n-3) \to n$; and
when $n=6$ or greater, then $n \to (n-1) \to n \to (n-2) \to n \to (n-) \to \ldots n \to 2 \to n \to \ldots \to n \to (n-2) \to n \to (n-1) \to n$.

63. The LED printer of claim 62, wherein each of said switching means has at least one offsetting field-effect transistor connected in parallel to said plurality of switching means.

64. The LED printer of claim 51, wherein each of said unit switching elements comprises either a single field-effect transistor or a plurality of field-effect transistors positioned adjacent to each other and connected in parallel to each other.

65. The LED printer of claim 64, wherein said N unit switching elements are of substantially the same shape and size and are arranged on a semiconductor substrate in one direction at equal intervals to form a switching-element array.

66. The LED printer of claim 53, wherein said N unit switching elements are of substantially the same shape and size and are arranged on a semiconductor substrate in one direction at equal intervals to form a switching-element array.

67. The LED printer of claim 51, wherein each of said unit switching elements comprises at least two field-effect transistors connected in parallel to each other, and wherein the field-effect transistors belonging to the different groups are arranged adjacent to each other.

68. The LED printer of claim 67, wherein said N unit switching elements are of substantially the same shape and size and are arranged on a semiconductor substrate in one direction at equal intervals to form a switching-element array.

69. The LED printer of claim 68, wherein each of said switching means has at least one offsetting field-effect transistor connected in parallel to said plurality of switching means.

70. The LED printer of claim 51, wherein each of said switching means has at least one offsetting field-effect transistor connected in parallel to said plurality of switching means.

* * * * *